(12) United States Patent
Novak et al.

(10) Patent No.: US 7,451,402 B2
(45) Date of Patent: Nov. 11, 2008

(54) METHODS AND SYSTEMS FOR CREATING SKINS

(75) Inventors: Michael J. Novak, Redmond, WA (US); David M. Nadalin, Redmond, WA (US); Kipley J. Olson, Mercer Island, WA (US); Kevin P. Larkin, Mercer Island, WA (US); Frank G. Sanborn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 11/128,758

(22) Filed: May 13, 2005

(65) Prior Publication Data

US 2005/0210050 A1 Sep. 22, 2005

Related U.S. Application Data

(62) Division of application No. 09/773,456, filed on Jan. 31, 2001, now Pat. No. 7,073,130.

(51) Int. Cl.
*G09G 9/00* (2006.01)
*G06F 13/00* (2006.01)

(52) U.S. Cl. ..................................... 715/744
(58) Field of Classification Search .................. 715/713, 715/751, 760, 744, 865, 764, 765, 746, 768, 715/763, 717–719, 762, 513–515
See application file for complete search history.

(56) References Cited

U.S. PATENT DOCUMENTS

| | | | |
|---|---|---|---|
| 5,887,193 A | 3/1999 | Takahashi et al. | |
| 5,905,492 A | 5/1999 | Straub et al. | |
| 5,907,704 A | 5/1999 | Gudmundson et al. | |
| 5,943,054 A | 8/1999 | Hirano et al. | |
| 5,956,736 A | 9/1999 | Hanson et al. | |
| 5,959,624 A | 9/1999 | Johnston, Jr. et al. | |
| 6,061,695 A | 5/2000 | Slivka et al. | |
| 6,104,391 A | 8/2000 | Johnston, Jr. et al. | |
| 6,188,399 B1 | 2/2001 | Voas et al. | |
| 6,237,043 B1 | 5/2001 | Brown et al. | |
| 6,243,102 B1 | 6/2001 | Ruff et al. | |
| 6,249,883 B1 | 6/2001 | Cassidy et al. | |
| 6,294,172 B1 | 9/2001 | Bosslet et al. | |
| 6,313,851 B1 | 11/2001 | Matthews, III et al. | |
| 6,392,671 B1 | 5/2002 | Glaser | |
| 6,404,433 B1 | 6/2002 | Ruff et al. | |
| 6,405,224 B1 | 6/2002 | Van Der Meer | |
| 6,429,882 B1 | 8/2002 | Abdelnur et al. | |
| 6,429,883 B1 | 8/2002 | Plow et al. | |
| 6,434,525 B1 | 8/2002 | Nagisa et al. | |
| 6,553,412 B1 | 4/2003 | Kloba et al. | |

(Continued)

OTHER PUBLICATIONS

U.S. Appl. No. 60/196,005, "Extensible Schema for Defining the Visual Apearance of Computer System Components," Apr. 2000.

(Continued)

*Primary Examiner*—Cao Nguyen
(74) *Attorney, Agent, or Firm*—Lee & Hayes, PLLC

(57) ABSTRACT

Methods and systems for creating and rendering skins are described, whereby an XML data structure comprises multiple tag pairs, individual tag pairs being associated with and referencing information that can be utilized to render a skin.

4 Claims, 16 Drawing Sheets

U.S. PATENT DOCUMENTS

| | | |
|---|---|---|
| 6,573,907 B1 * | 6/2003 | Madrane .................... 715/719 |
| 6,590,590 B1 | 7/2003 | Wen et al. |
| 6,651,108 B2 | 11/2003 | Popp et al. |
| 6,717,593 B1 | 4/2004 | Jennings |
| 6,724,403 B1 | 4/2004 | Santoro et al. |
| 6,757,821 B1 | 6/2004 | Akiyama et al. |
| 6,760,043 B2 | 7/2004 | Markel |
| 6,778,992 B1 | 8/2004 | Searle et al. |
| 6,791,581 B2 | 9/2004 | Novak et al. |
| 6,865,593 B1 | 3/2005 | Reshef et al. |
| 6,920,606 B1 | 7/2005 | Jablonski et al. |
| 7,028,262 B2 * | 4/2006 | Estrada et al. .............. 715/751 |
| 7,073,130 B2 | 7/2006 | Novak et al. |
| 7,222,307 B2 | 5/2007 | Morris et al. |
| 7,281,214 B2 | 10/2007 | Fadell |
| 7,320,109 B1 | 1/2008 | Zeevi et al. |
| 2002/0024539 A1 | 2/2002 | Eleftheriadis |
| 2002/0027571 A1 | 3/2002 | Matthews, III et al. |
| 2002/0073343 A1 | 6/2002 | Ziskind et al. |
| 2002/0099713 A1 | 7/2002 | Fernandez |
| 2003/0140120 A1 | 7/2003 | Hartman |
| 2004/0061713 A1 | 4/2004 | Jennings |
| 2004/0210825 A1 | 10/2004 | Novak et al. |
| 2005/0044504 A1 | 2/2005 | Fernandez et al. |
| 2005/0102626 A1 | 5/2005 | Novak et al. |
| 2005/0102627 A1 | 5/2005 | Novak et al. |
| 2005/0210050 A1 | 9/2005 | Novak et al. |
| 2005/0210051 A1 | 9/2005 | Novak et al. |
| 2005/0210398 A1 | 9/2005 | Novak et al. |
| 2005/0210446 A1 | 9/2005 | Novak et al. |
| 2005/0229105 A1 | 10/2005 | Novak et al. |

OTHER PUBLICATIONS

"Design Java Servlets with the Delegation Event Mode," Sep. 1999, JavaWorld, pp. 1-12.

Westphal, "Using XML for Object Persistence", retrieved on Apr. 29, 2007, at <<http://www.xml.com/lpt/a/1999/09/serialization/index.html>>, O'Reilly Media, Inc., 1998-2006, pp. 20.

* cited by examiner

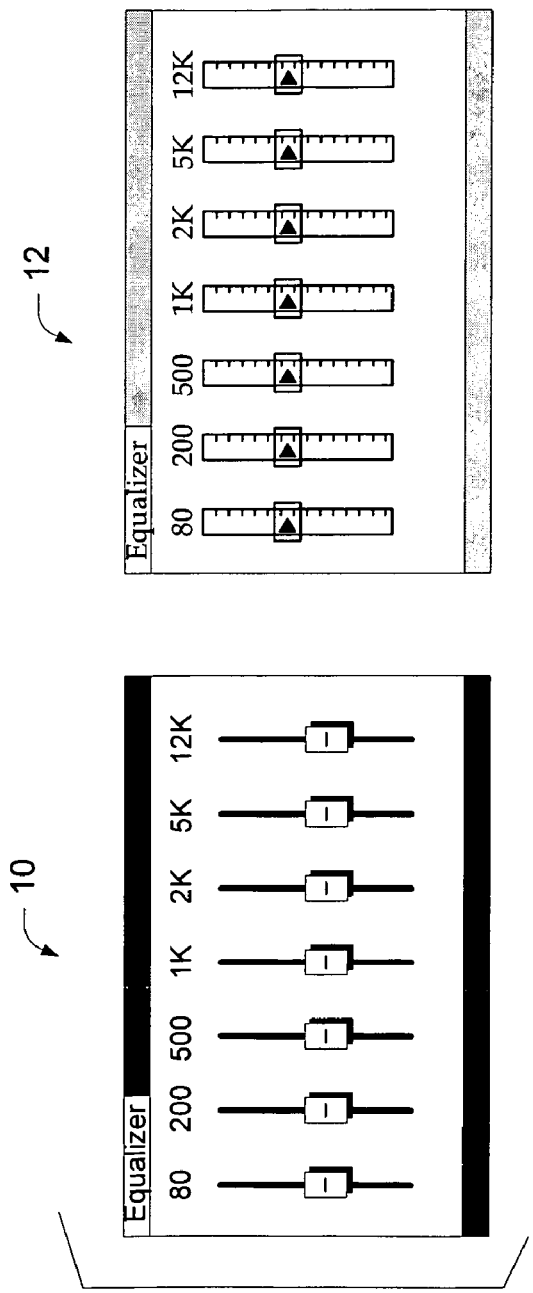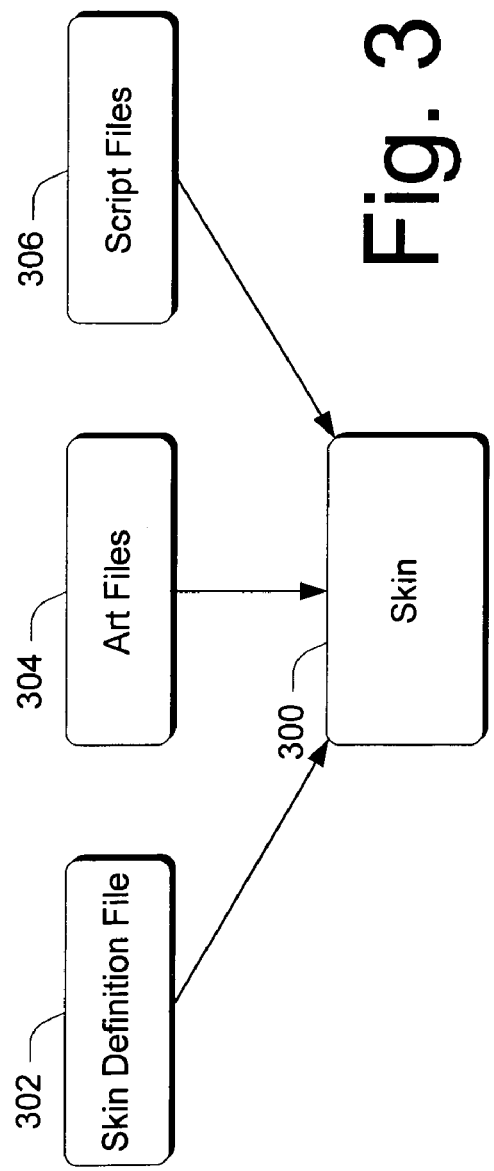

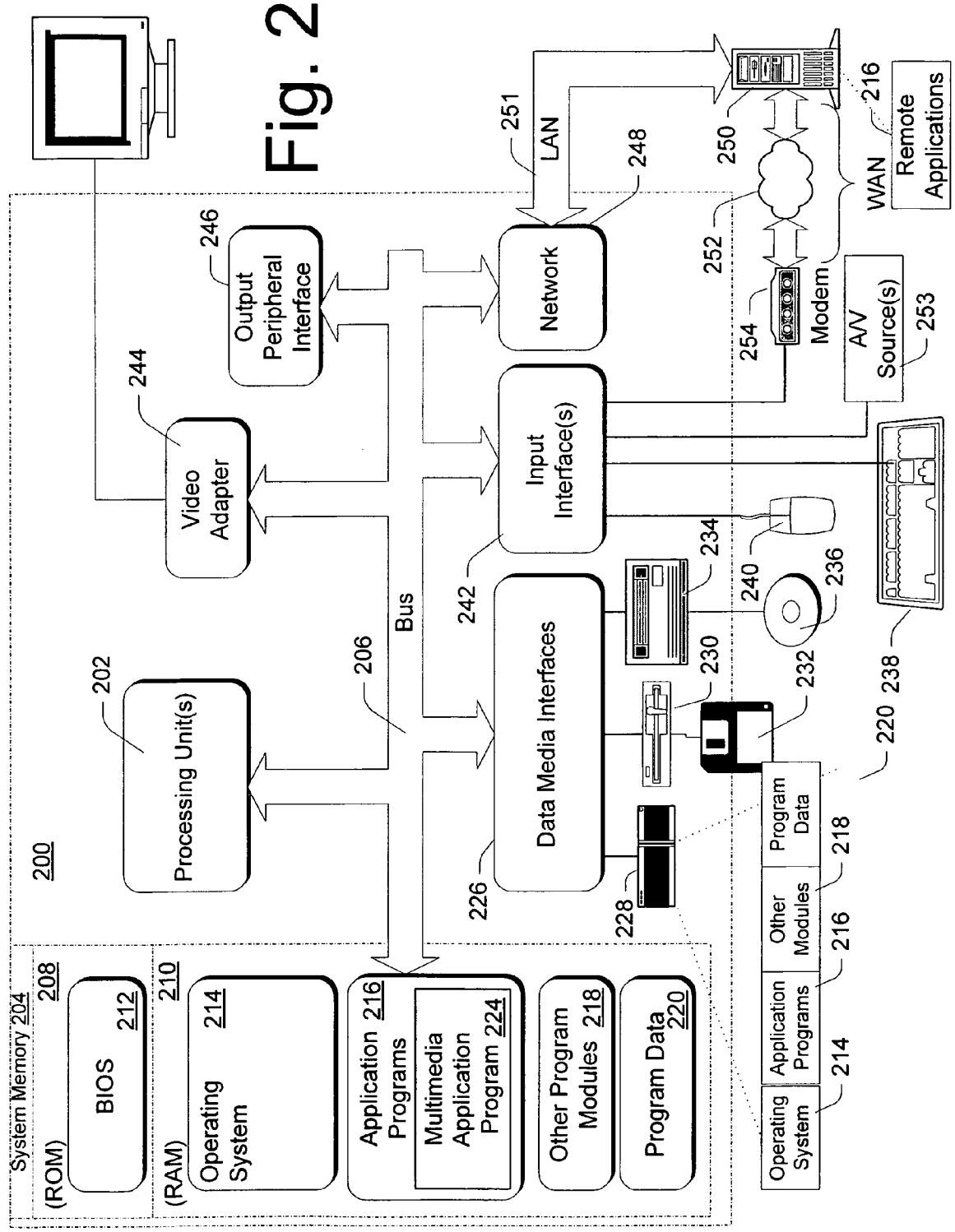

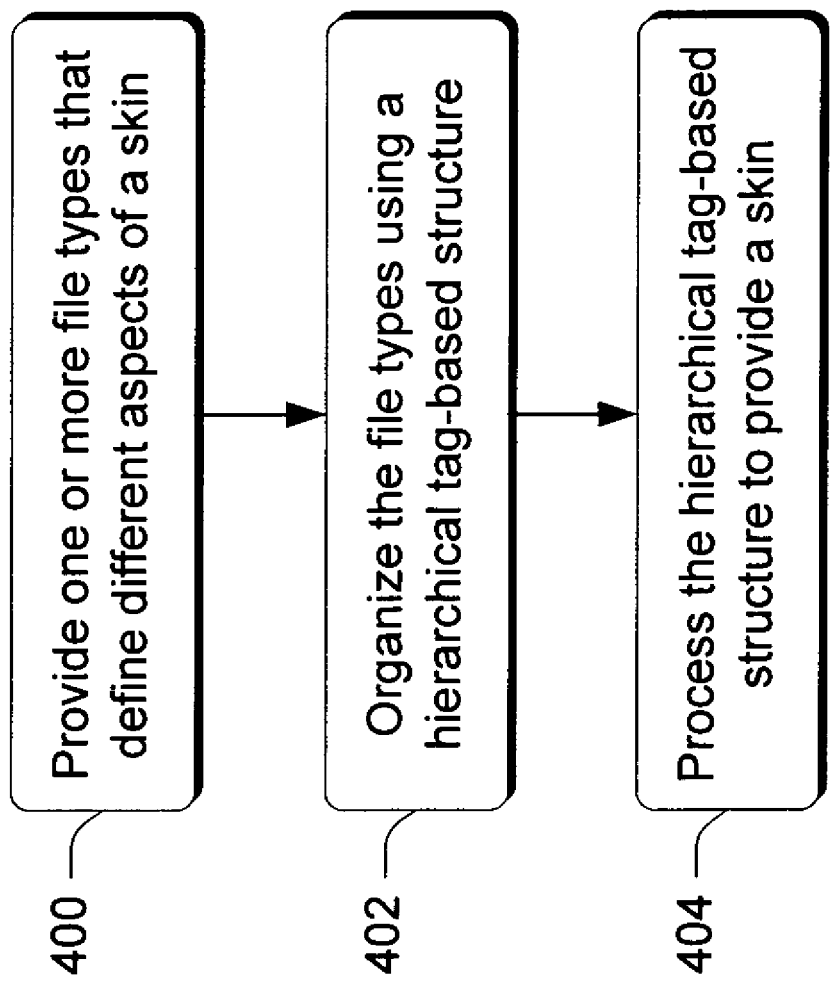

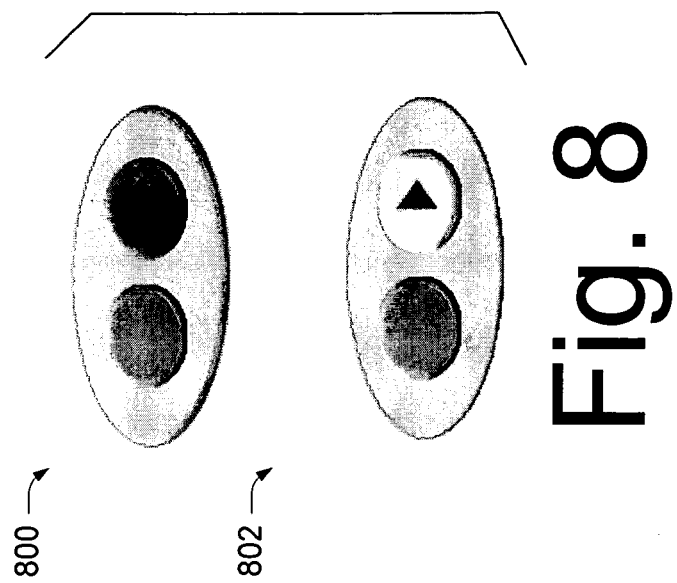
Fig. 7
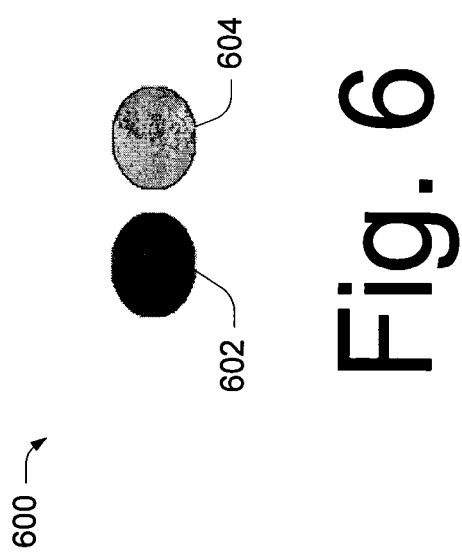
Fig. 8
Fig. 5
Fig. 6

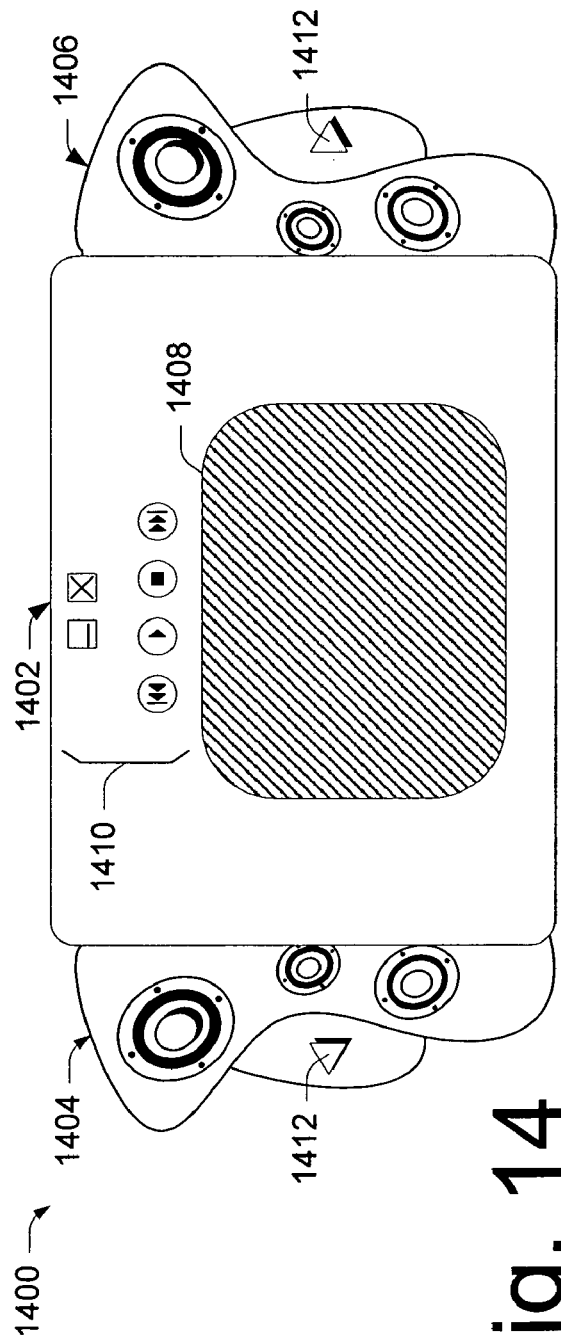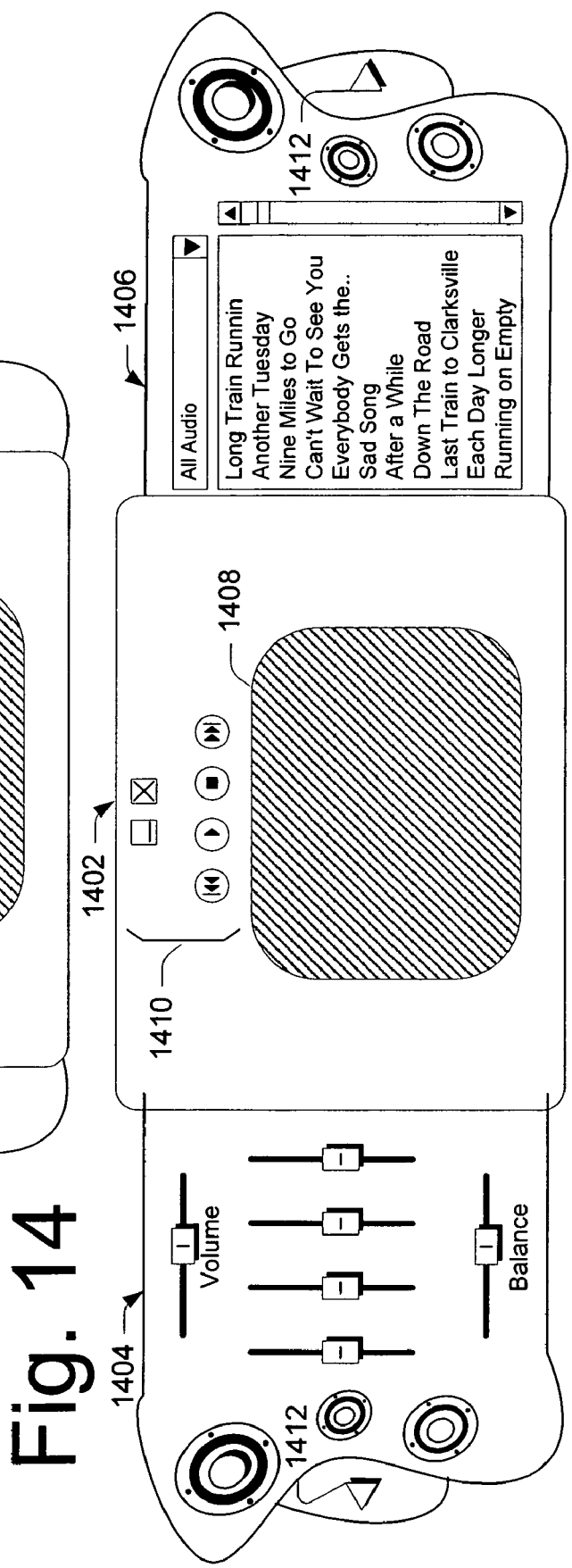
Fig. 14

```
<THEME>
  <VIEW>
    <PLAYER>
      <SETTINGS>
        volume_onchange="volumeslider.value = volume;" >
      </SETTINGS>
    </PLAYER>
    <SLIDER>
      id="volumeslider"
      min="0"
      max="100"
      onpositionchange="player.settings.volume = value;" >
    </SLIDER>
  </VIEW>
</THEME>
```

Fig. 18

```
<THEME>
  <VIEW>
    <SLIDER>
      min="0"
      max="100"
      value="wmpprop:player.settings.volume"      ← 1900
      onpositionchange="player.settings.volume = value;" >   ← 1902
    </SLIDER>
  </VIEW>
</THEME>
```

Fig. 19

```
<THEME>
  <VIEW>
    <BUTTON
      id=play
      visible="TRUE" />
    <BUTTON
      id=pause
      visible="wmpprop:play.visible" />
  </VIEW>
</THEME>
```

Fig. 20 skin.wms
```
<THEME>
  <VIEW>
    <PLAYER>
      playstatechange="EnablePlayButton();"
      openstatechange="EnablePlayButton();"
    </PLAYER>
    <PLAYBUTTON
      id="play"
      image="play.bmp"
      disabledimage="play_disabled.bmp"
      onpositionchange="player.settings.volume = value;" >
    </PLAYBUTTON>
  </VIEW>
</THEME>
``` skin.js
```
function EnablePlayButton ()
{
    play.enabled = (player.playState != wmppsPlaying) &&
                   (player.openState == wmposMediaOpen);
}
```

Fig. 21

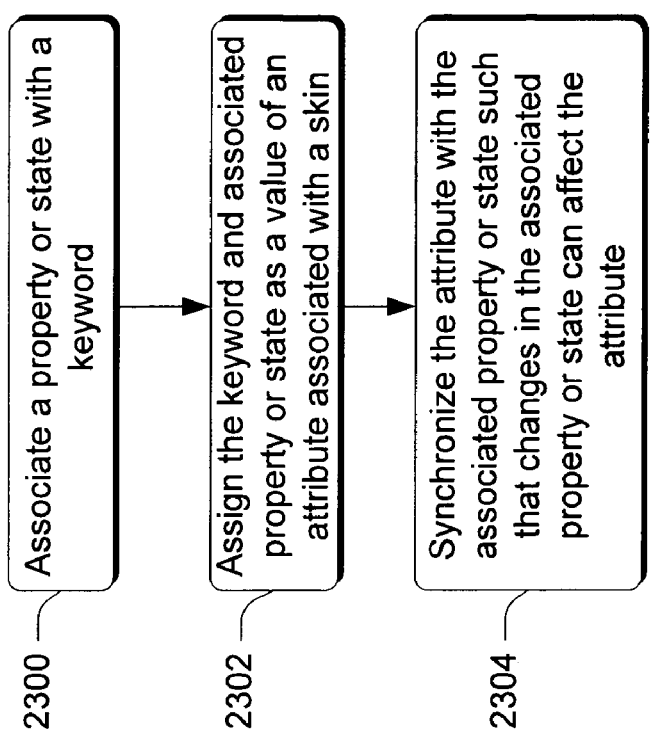

2300 — Associate a property or state with a keyword

2302 — Assign the keyword and associated property or state as a value of an attribute associated with a skin 2304 — Synchronize the attribute with the associated property or state such that changes in the associated property or state can affect the attribute

Fig. 23

```
<THEME>
  <VIEW>
    <PLAYBUTTON
        image="play.bmp"
        disabledimage="play_disabled.bmp"
        enabled="wmpenabled:player.controls.play();" >
    </PLAYBUTTON>
  </VIEW>
</THEME>
```

Fig. 22

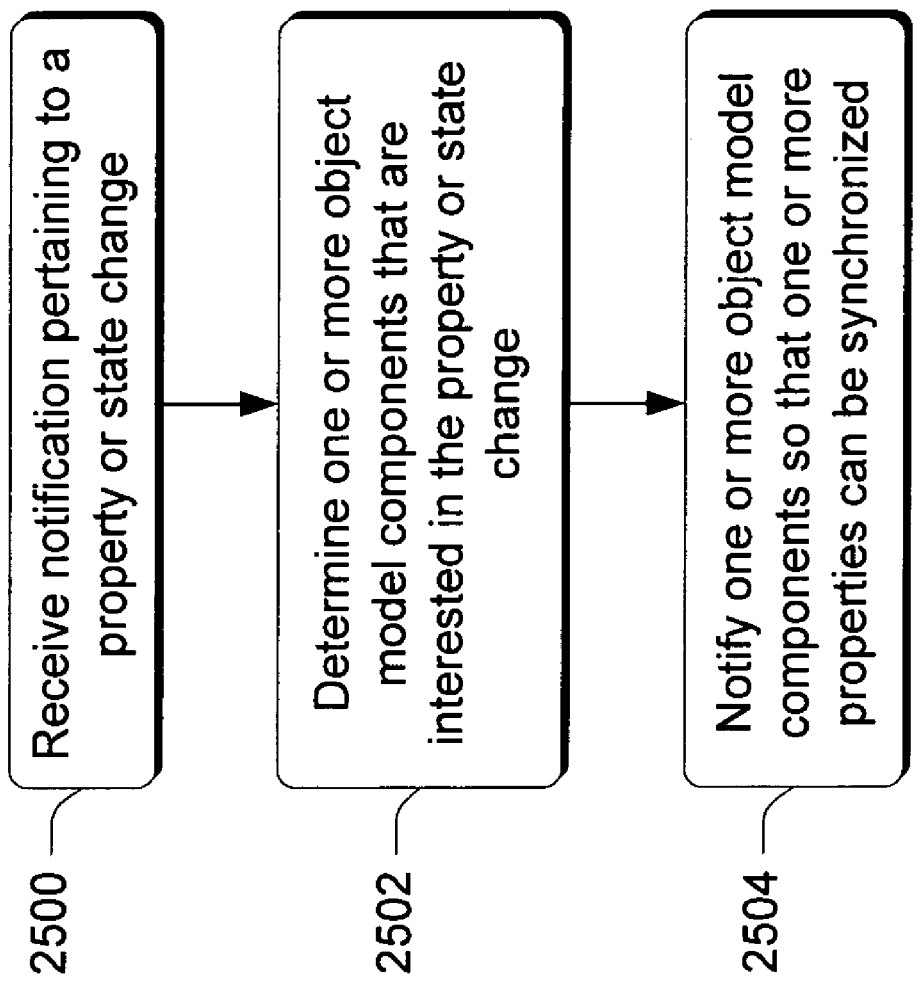

METHODS AND SYSTEMS FOR CREATING SKINS

RELATED APPLICATION

This application is a divisional of and claims priority to U.S. patent application Ser. No. 09/773,456, filed on Jan. 31, 2001, the disclosure of which is incorporated by reference herein.

TECHNICAL FIELD

This invention relates generally to methods and systems for creating and using so-called skins.

BACKGROUND

Many software applications provide a user with the ability to interact with the application in some manner. The mechanism by which a user is permitted to interact with a software application is called a user interface or "UI". User interfaces typically provide controls or buttons that can be engaged by a user to cause a predetermined result. For example, a user might use their mouse to click on a button that minimizes or enlarges a particular UI. Alternately, a software application such as a media player may have several buttons that permit a user to play, pause, fast-forward, reverse, and control the volume of a particular piece of media that is playing on their computer.

UIs have, in the past, been generally fixed insofar as their layout and functionality is concerned. One primary reason for this stems from the desire to impart standardization to various UIs. Yet, against the backdrop of standardized UIs, there began to surface concerns associated with providing the ability to impart a different look to various UIs. For example, original equipment manufacturers who produced particular software applications using a predefined platform wanted the capability of "branding" their product. To meet these and other concerns so-called "skins" or skinning models began to surface.

Conventional skinning models provide the user or designer with an opportunity to change the look of a particular UI. They do so by providing a skin that serves as the visual portion of the UI—that is, the portion that the user sees when they interact with an application. In the past, and indeed the present, skin providers have been limited in the flexibility with which they can provide their skins. Specifically, skin providers have only been able to change the look of the UI, and have not been able to change the layout or functionality of the UI.

FIG. 1 shows a few exemplary skins, generally at 10 and 12, that are associated with a software application that provides functionality associated with an equalizer such as one would find on a stereo player. Notice that the look of the skins is different, but their layout and functionality is the same. Specifically, each skin has seven buttons and each button is associated with a setting from between 80 to 12K. The button, here in the form of a slider, can be adjusted up and down to vary each individual setting. The difference in the appearance or look of each skin is effected by using a different static bitmap to render the skin. Specifically to render skin 10, a first bitmap is used; and, to render skin 12 a second bitmap is used. Using static bitmaps to change the appearance of skins is a small step toward providing a unique user experience, but falls far short of providing a truly robust, flexible and rich user experience.

Accordingly, the invention arose out of concerns associated with providing improved skinning models and methods that provide a truly robust, flexible and rich user experience.

SUMMARY

Methods and systems for creating and rendering skins are described. In one described embodiment, an XML data structure comprises multiple tag pairs, individual tag pairs being associated with and referencing information that can be utilized to render a skin.

BRIEF DESCRIPTION OF THE DRAWINGS

FIG. 1 is diagram that illustrates exemplary skins in accordance with the prior art.

FIG. 2 is a block diagram of an exemplary computer system in which the inventive systems and methods can be employed.

FIG. 3 is a block diagram that illustrates aspects of one described embodiment.

FIG. 4 is a flow diagram that describes steps in a method in accordance with one described embodiment.

FIG. 5 illustrates an exemplary skin in accordance with one described embodiment.

FIG. 6 illustrates an exemplary mapping image in accordance with one described embodiment.

FIG. 7 illustrates an exemplary alternate image in accordance with one described embodiment.

FIG. 8 illustrates an exemplary image in accordance with one described embodiment.

FIG. 14 is a diagram that illustrates two views of an exemplary skin that can be rendered in accordance with one described embodiment.

FIG. 18 is a data structure that illustrates the use of script in connection with a skin.

FIG. 19 is a data structure that illustrates property synchronization aspects in accordance with one described embodiment.

FIG. 20 is a data structure that illustrates property synchronization aspects in accordance with one described embodiment.

FIG. 21 is a data structure that illustrates the use of script in connection with a skin.

FIG. 22 is a data structure that illustrates property synchronization aspects in accordance with one described embodiment.

FIG. 23 is a flow diagram that describes steps in a method in accordance with one described embodiment.

FIG. 25 is a flow diagram that describes steps in a method in accordance with one described embodiment.

DETAILED DESCRIPTION

Overview

Figures 9, 10:
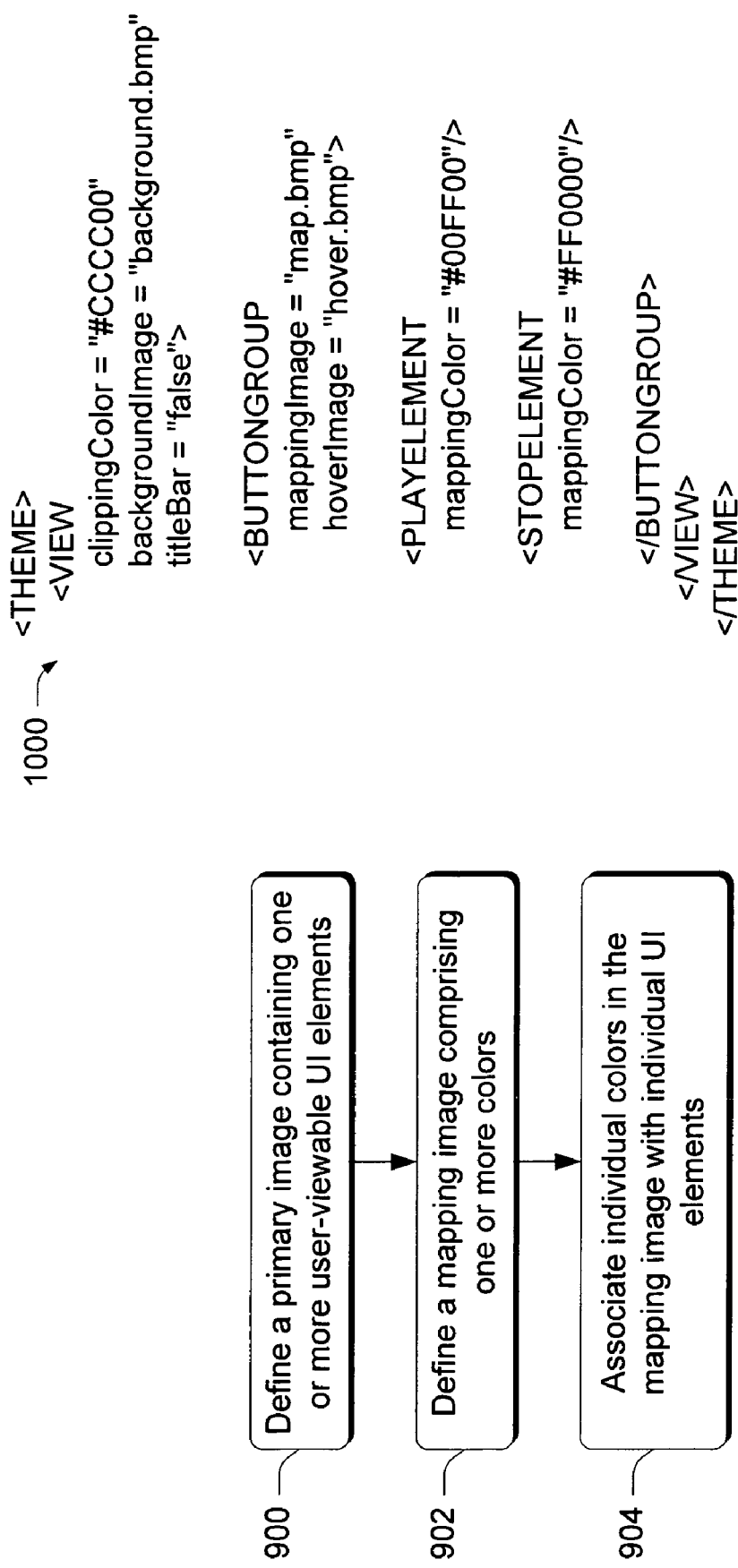
FIG. 9 is a flow diagram that describes steps in a method in accordance with one described embodiment.
FIG. 10 shows an exemplary XML data structure in accordance with one described embodiment.

The inventive principles and methods described below provide tools that can be used to provide a robust degree of flexibility in creating skins. The tools can be used to provide custom skins that are dynamic, and can be used by original equipment manufacturers (OEMs), independent hardware vendors, and end users alike to create skins that are unique in appearance, function, and layout.

The described embodiments can provide a programming platform to create custom skins. Skins can be defined as sets of scripts, art, media, and text files that can be combined to create a new appearance for whatever software application they are used in conjunction with. In the description that follows, the inventive skinning techniques and structures are described in the context of their use in conjunction with Microsoft's Windows Media Player software. It is to be appreciated and understood, however, that the inventive techniques and structures can be utilized in connection with any suitable software application or applications where it is desirable to provide a user interface in the form of a skin. Specific types of exemplary software applications are simply too numerous to list, but will be appreciated and understood by those of skill in the art.

The described embodiments make use of a hierarchical tag-based language to define the user interface or skin. In the described embodiments, the hierarchical tag-based language comprises extensible mark-up language (XML), which is an extension of HTML. XML is used to define the skin, and provide various skin properties. In one implementation, scripting techniques can be utilized to interact with the skin or, more accurately its object model, to provide a truly flexible and dynamic skin. The scripting techniques utilize software code that "listens" for various events and then, responsive to an event, can then cause some action to occur relative to the skin.

Using the skinning model described below, one can change not only the way a software application looks, but how its UI functions as well—e.g. not just where the knobs and buttons are and what they look like, but what they do, given the limits of the underlying software application technology.

Exemplary Computer Environment

FIG. 2 illustrates an example of a suitable computing environment 200 on which the inventive skinning model described below may be implemented.

It is to be appreciated that computing environment 200 is only one example of a suitable computing environment and is not intended to suggest any limitation as to the scope of use or functionality of the skinning model described below. Neither should the computing environment 200 be interpreted as having any dependency or requirement relating to any one or combination of components illustrated in the exemplary computing environment 200.

The skinning model can be operational with numerous other general purpose or special purpose computing system environments or configurations. Examples of well known computing systems, environments, and/or configurations that may be suitable for use with the skinning model include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the skinning model and techniques can be described in the general context of computer-executable instructions, such as program modules, being executed by a computer. Generally, program modules include routines, programs, objects, components, data structures, etc. that perform particular tasks or implement particular abstract data types. The skinning model may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2 computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. Some of the application programs can be configured to present a user interface (UI) that is configured to allow a user to interact with the application program in some manner using some type of input device. This UI is typically a visual display that is capable of receiving user input and processing that user input in some way. Such a UI may, for example, comprises one or more buttons or controls that can be clicked on by a user.

Continuing with FIG. 2, a user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer 200.

As shown in FIG. 2. computing system 200 can be communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Skin Definition

The embodiments described below provide the capability for creating unique user interfaces or skins. The skinning model that permits creation of the skins allows for adaptable, dynamic skins to be designed that do not have to be constrained in their layout. For example, if you want to put the "Close" button in the middle of the screen, you can do that. Perhaps you do not like the way the "Close" button looks (it looks like an "X" inside a box); if you want it to look like a skull and crossbones, you can make a user interface where the "Close" button is just that. The skinning model provides all the tools one needs to make a custom user interface. In the context of Windows Media Player, the user interface can include buttons, slider bars, video windows, visualization windows, equalization bars, and so on.

There are several good reasons why one might want to create their own user interface for Windows Media Player (and other applications). One reason is to add functionality that is not already in Windows Media Player. For example, you might want to create a player that plays music from playlists that are based on the time of day, so that you have upbeat rock in the morning and slow jazz in the evening. Or, perhaps you want to make a skin with a big red button that will stop the music quickly. Windows Media Player does not come with a "play the same song over and over again until my roommate goes crazy" button, but if you want one, you can create it.

Another reason for creating a skin is to make a branded look for Windows Media Player. If you are distributing music from your Web site and use a particular logo, you might want to design a skin that uses your logo to remind people about your site. If you have a rock band, you can make a skin with pictures of your band on it.

And, another good reason to make skins is to make something unique that can dress up your desktop. When your friends come over and ask you what that cool program on your screen is, you can say you made it yourself. You can even take a picture of your dog, scan it into your computer, add some buttons, and click on your dog's nose to start music and the tail to stop it. You can create different skins for different kinds of music or have a different skin for every day of the week.

Skin File Types

A skin is typically composed of several files. Technically speaking, a skin comprises a group of files, with each file containing a specific kind of information that is utilized to render or in some way provide functionality for the skin.

FIG. 3 shows a diagram that illustrates exemplary file types that can be utilized to make up or define a skin 300. In this example, the exemplary file types include a skin definition file 302, one or more art files 304, and one or more script files 306. It is to be appreciated and understood that script files 306 may or may not be used to make up a skin. The script files, as will become evident below, provide a means by which a skin can be interactive relative to various events.

Skin Definition File

Skin definition file 302 is a master file that defines how the other files will be used. In the illustrated embodiment, this is a text file and has the extension ".wms". Skin definition files are analogous to traffic coordinators of a skin. Inside this file are the basic instructions for what the skin does and where the other pieces are. There is typically only one skin definition file for a skin. The skin definition file and related files can be collected and compressed into a compressed file, e.g. a Zip file. When this is the case, the extension is ".wmz" (Windows Media Zipped).

Instructions in the skin definition file are written in a hierarchical tag-based language. In the illustrated example, this language is XML, (i.e. eXtensible Markup Language), an extension to HTML. The XML in the skin definition file uses a set of special element tags or tag pairs to define parts of the skin user interface. For example, a <BUTTON> tag defines how a button will behave, where it will go, and what it will look like. Specific examples of various XML data structures that use such tag pairs are given below.

Each element tag has specific attributes or properties. In this document, the terms "attributes" and "properties" will be used interchangeably. For example, the BUTTON element has an Image attribute that defines where the picture of the button can be found. This is similar to HTML, where the BODY element will have a BgColor attribute which defines the background color of the body of the HTML page.

In the illustrated and described embodiment, the skin definition file follows a specific structure. You start with a Theme, create one or more Views, and then define each View with the user interface elements appropriate for the type of View you want to use.

The Theme element is the root element for a skin. There is only one Theme element in a skin definition file, and it is at the top level. Each Theme has at least one View. The View governs the particular image you see on the screen. There may be more than one View to enable switching back and forth. For example, you might want to have a large view for working with playlists, a medium view for watching visualizations, and a tiny view that fits in a corner of the screen.

Each View element can also have one or more Subview elements. A Subview element is similar to a view element and can be used for parts of a skin that you want to move around, hide, or show. For example, a Subview element might be used to create a sliding tray that pops out of your skin to display a graphic equalizer. Subviews are discussed in more detail below in a section entitled "Subviews".

Once Theme and View elements are defined, the View is populated with specific user interface elements. Any suitable user interface elements can be used. If an element can be seen by the user, it is called a control. Examples of controls can include, without limitation, the following controls: Buttons, Sliders, Custom Cliders, and Progress Bars, Text control, Video Windows, Visualization Windows, Playlist Windows, and SubView Windows.

FIG. 4 is a flow diagram that describes steps in a skin-organizing method in accordance with the described embodiment. The method can be implemented in any suitable hardware, software, firmware or combination thereof. In the described embodiment, aspects of the method are implemented in software.

Step 400 provides one or more file types that define different aspects of a skin. In the illustrated and described embodiment, the file types can include, without limitation, file types associated with art (termed "art files" above) that is used to define aspects of a skin's appearance, and file types associated with script that provide for skin interactivity. It will be appreciated that the art files that can be utilized as described above and below can extend the look of a particular skin much further than was previously possible using static bitmaps. The script files provide the ability to impart functionality and interactivity to skins that was heretofore entirely absent from conventional skinning models. Step 402 organizes the file types using a hierarchical tag-based structure. In the illustrated and described embodiment, this step is implemented using an XML data structure, an example of which is given below. The use of XML to represent or describe a skin constitutes a noteworthy and inventive departure from past methods. Recall that in the past, static bitmaps were used to impart a different look to a skin. The layout, feel and functionality of a skin, however, were fixed. By using XML to describe or define the skin, the skin designer is given the flexibility to robustly vary not only the look, but the layout, feel and functionality as well. Step 404 processes the hierarchical tag-based structure to provide a skin. An exemplary computer architecture that is capable of processing the hierarchical tag-based structure is described below in a section entitled "Exemplary Computer Architecture".

The following discussion describes but a few exemplary components or elements that can be provided on a skin, using the inventive skinning model described below. These components include, without limitation, buttons, sliders, text, video, equalizer settings, visualizations, playlists, and subviews.

Buttons

Buttons are a popular part of a skin and can be used to trigger actions such as play, stop, quit, minimize, and switch to different view. The Windows Media Player provides the skin creator with two types of button elements: the BUTTON element and the BUTTONGROUP element. In addition, there can be several predefined types of buttons.

The BUTTON element is used for stand-alone buttons. If the BUTTON element is used, an image (i.e. art file) for each button is typically supplied and the exact location where the button is to appear, relative to a background image should be defined in pixels. One of the advantages of the BUTTON element is that the button image can be changed dynamically.

The BUTTONGROUP element can be used for groups of buttons. In fact, each BUTTONGROUP element is enclosed with a set of BUTTONGROUP tags in the XML definition file. Using button groups is easier than using individual buttons because the exact location for each button need not be specified. Instead, a separate image map is supplied and defines the actions that will take place when the mouse hovers over or clicks an area on a background. An image map can be created by taking the art from a background and copying it to a mapping layer in an art program. Using an art program is faster and more precise than trying to define exactly where a non-group button should be placed on a background. This is discussed in more detail below in a section entitled "Simple Art Example".

There are several predefined buttons that can be provided. For example, a PLAYELEMENT button can be used to play media files and a STOPELEMENT button can be used to stop the play of media files. An IMAGEBUTTON can be used to display images that can change in response to specific events.

Sliders

Sliders are useful for working with information that changes over time. For example, a slider can be used to indicate the amount of music that has already played for a given media. Sliders can be horizontal or vertical, linear or circular, or any shape that can be defined by a user. Sliders come in three varieties: sliders, progress bars, and custom sliders. A SLIDER element can be used for volume controls or to allow the user to move to a different part of the media content. Progress bars are similar to sliders. Progress bars are designed for displaying information that changes, but not data that the user will want to interact with. For example, a progress bar can be used to indicate a buffering progress. A custom slider can be used to create controls such as knobs, or do unusual control mechanisms. For example, if you want to create a volume control that wraps around a skin, you can do it with a custom slider. The custom slider is set up by creating an image map that contains grayscale images to define the locations of the values on the slider. This is relatively easy to do with an art program that has layers.

Text

A TEXT element can be used to display text on a skin, such as song titles and the like.

Video

Video can be displayed in a skin. A VIDEO element can be used to set the size and position of the video window. A user can also change the video settings with a VIDEOSETTINGS element. For example, you can create controls to adjust the brightness of the video.

Equalizer Settings

The filtering for specific audio frequency bands can be set by using an EQUALIZERSETTINGS element. Essentially this means you can boost the bass, tweak the treble, and set up your sounds to match your ears or your living room.

Visualizations

Visualizations can be displayed in a skin. Visualizations are visual effects that change over time as audio is playing through Windows Media Player. An EFFECTS element determines where the visualizations will play, what size the window will be, and which visualizations will be played.

Playlists

A PLAYLIST element can allow the user to select an item from a specific playlist.

SubViews

SubViews can be used to display secondary sets of interface controls, such as a playlist or video controls.

Art Files

Each skin has one or more associated art files. In the illustrated and described embodiment, there are three uses of art or art files in the skins.

First, there are primary images. Primary images are what the users will see when they install a skin. The primary image is composed of one or more images that are created by specific skin controls. If you have more than one control, you must typically specify a "z-order". The z-order defines which controls are displayed "in front" of other ones. Each View element defines one background image. Other images can be defined that can be added to the background image to allow for the creation of a primary composite image. An example of this is given below in the section entitled "Simple Art Example". You also may have secondary images, such as a sliding tray, that do not display when your skin first appears, but that show up when the user takes some action. These follow the same rules as primary images, in that they are created with a set of controls.

Second, there are mapping images. Mapping images are used for specific controls to specify which regions will respond to mouse clicks and to determine which controls receive which events. Different controls can require different types of mapping. For example, a ButtonElement control needs a map that has a different color for each button. The colored areas in the mapping file must correspond to the areas of the buttons you want to map. You can use image mapping to trigger events for your skin. Image maps are files that contain special images. The images in an image map file, however, are not meant to be viewed by the user, but are used by Windows Media Player to take action when the user clicks on your skin. In essence, the user cannot see them, but the mouse can. Different controls need different kinds of image maps. For example, if you color part of an image map a specific red value, and the user clicks on the corresponding area of your primary image, a button will fire an event. Color is used to define which events are triggered by clicks in what areas of the skin.

Third, there are alternate images that can be displayed when a user does something. For example, you can create an alternate image of a button that will be displayed only when the mouse hovers over the button. This is a good way to let users know what they can do, and also allows for a highly discoverable user interface.

The art files can have any suitable type of format. The following format types are recognized by the Windows Media Player: BMP, JPG, GIF, and PNG.

Simple Art Example

FIG. 5 shows an exemplary skin 500 having two buttons 502, 504. Skin 500 was constructed using three art files. In this example, a primary image and a mapping image are required, and an alternate image provides a visual cue to the user that a button is clickable. The art files can be created using any suitable software. An art program that uses layers is easier to work with because you will want to make sure that your primary, mapping, and alternate images all are the same size and line up with each other.

Primary Image

The primary image comprises a simple yellow oval 506 with two buttons 502, 504. Throughout this example, various colors are used to illustrate aspects of the image. Any suitable colors can be used, with the specifically described colors constituting but exemplary colors. Button 502 is a pink button to start Windows Media Player and button 504 is a purple button to stop the Media Player. A background 508 is a slightly darker yellow than the oval. The primary image was created from the oval image 506, button images 502, 504, and background image 508, each in a separate layer. The oval image was created with a layer bevel and emboss effect. Then, the two button images were created, also with layer and emboss effects. Next, the image background was created. A slightly darker yellow was chosen so that any anti-aliasing between the oval and the background will not be noticed.

The layers that contained these images were made visible and saved as a copy in the bitmap (bmp) format, thus creating the primary image. The primary composited image is used by the backgroundImage attribute of the VIEW element, an example of which is given below in connection with FIG. 9.

Mapping Image

FIG. 6 shows an exemplary mapping image 600. A mapping image is used to specify when and where a skin is clicked. Use of a mapping image can enable irregularly-shaped controls to be rendered. In the present example, mapping image 600 was created with a red area 602 and a green area 604.

The green area 604 will be used to identify the area on the skin that will start Windows Media Player, and the red area 602 will be used to stop it. In this example, the mapping image is the same size as the primary image.

The mapping image was created by copying the button layer to a new layer and turning off the bevel and emboss effect. Flat images are used for mapping because Windows Media Player will be looking for single color values in each area. It can only search for a color you define, for instance red (#FF0000), and if your image has a bevel or other effect, not all of it will be the exact red you need. To make the mapping buttons an easy color to remember, the images were filled with pure red and pure green, but any color can be used. You will need to remember the color numbers in your map so that they can be entered in the XML skin definition file an example of which is given below in connection with FIG. 9. In this case, red is #FF0000 and green is #00FF00.

Then, with only the new layer visible, the image was saved as a copy to a bitmap (bmp) file. It will be called by the mappingImage attribute of the BUTTONGROUP element.

Alternate Image

FIG. 7 shows an alternate image 700 in accordance with the described embodiment. Alternate images are not required, but are very useful to give visual cues to the user. In this case, a hover image is defined so that the user knows what areas can be clicked on. An alternate image was created with two yellow buttons 702, 704. The alternate image was created, in this example, by copying the original button layer to a new layer and then changing the fill color to yellow. The bevel and emboss effect was kept. Then a new layer was created and images were added: the arrow indicates "play" and the square indicates "stop". Then, with only the new yellow button and type layers visible, the image was saved as a copy to a bitmap file.

The result is that when the mouse hovers over an area defined by the mapping image, the hover image will be displayed, alerting the reader that if they click on that spot, they can play or stop Windows Media Player.

Final Image

FIG. 8 shows the final image of the skin generally at 800. Image 802 is the skin image that the user will see if they hover their mouse over pink button 502 (FIG. 5).

FIG. 9 is a flow diagram that describes steps in a skin-rendering method in accordance with the described embodiment. The method can be implemented in any suitable hardware, software, firmware or combination thereof. In the described embodiment, aspects of the method are implemented in software.

Step 900 defines a primary image containing one or more user-viewable UI elements that make up a skin. This primary image is the image that the user sees when the skin is activated or loaded. Step 902 defines a mapping image comprising one or more colors. Each color is associated with or defines a region of the mapping image. Step 904 associates individual colors of the mapping image with individual UI elements that make up the skin. Thus, each individual UI element is associated with a color on the mapping image. This particular color defines a region that "belongs" to the UI element. When a skin is rendered, this color region is not seen by a user, but rather is used by the rendering software to define that area of the skin that is dedicated for the UI element. This area can then define the "clickable" area for a UI element. It is to be appreciated and understood that the use of a mapping image to define color regions associated with actual skin areas of the UI elements can permit irregularly-shaped and unique UI elements to be formed. This is a significant departure from past methods in which UI elements were essentially limited to rectangular shapes or collections of rectangular shapes.

XML Code for the Simple Art Example

One advantage of the described embodiment is that very little code is required to create a working skin. FIG. 10 shows an exemplary XML definition 1000 that can be used for the example skin above. In this XML definition, the association between individual colors of a mapping image and individual UI elements is established and constitutes but one exemplary implementation of step 904 above.

Predefined buttons are used for the play and stop functions (i.e. PLAYELEMENT and STOPELEMENT respectively). In this particular example, the clippingColor attribute of the VIEW tag is assigned color "#CCCC00". The backgroundImage attribute is assigned "background.bmp", which corresponds to bitmap image 500 in FIG. 5. The BUTTONGROUP tag includes a mapping image and a hover image respectively represented by the attributes "mappingImage" and "hoverImage". Each of these attributes is assigned a bitmap file that corresponds to that attribute. For example, "mappingImage"="map.bmp" and "hovemImage"="hover.bmp". The "map.bmp" file corresponds to image 600 in FIG. 6, and the "hover.bmp" file corresponds to image 700 in FIG. 7. Notice also that for each of the predefined buttons within the BUTTONGROUP element, an attribute "mappingColor" is assigned a different color.

Accordingly, in this XML definition, the following can be ascertained. There is a mapping image called "map.bmp" which is assigned as a value of the mappingImage attribute and contains at least two colors that define regions of the mapping image. These colors are "#00FF00" and "#FF0000". These colors are, in turn, assigned as values for mappingColor attributes for each of the illustrated buttons. That is, "#00FF00" is assigned as a color for the PLAYELEMENT button and "#FF0000" is assigned as a color for the STOPELEMENT button. Now, when a skin is rendered for this particular XML definition, each particular button will be formed in an area that corresponds to and is of the same shape as its associated color region in the "map.bmp".

Script Files

Another type of file or files that can be, but need not be included in the skin definition is a script file(s). In the illustrated and described example, script files in the form of JScript files are utilized. It is to be appreciated and understood that any suitable script types can be utilized.

In the present example, script files are loaded using a scriptFile attribute that is associated with the VIEW element.

Script files are typically text files and can be used to create elaborate functionality behind a skin. By creating functions in JScript, you can do almost anything imaginable with skins, as will be appreciated by those of skill in the art. For example, you could use a different playlist for every day of the week, but always have the same one on Friday.

The use of script files provides the capability for a skin to respond to various events. For example, through the use of script files, a skin can "do" something (i.e. react) when the user clicks on a button. Script files also enable a skin to respond to changes that happen to the application which, in the present case, is Windows Media Player. Such response might be one that changes, for example, with the progress of the media file that is playing.

Handling Events

Aside from the XML code that a skin designer can write to initialize attributes for a skin, the primary code that can be written to impart functionality to a skin is JScript code to handle events. Any script code can, however, be used. Events can be either external or internal; that is, they come from either the user or from the application which in this case is Windows Media Player.

External Events

When users click a button or press a key, a response to their input can be generated with event handlers. An event handler is simply a section of code that runs whenever the event is triggered. In the Windows Media Player example, the following events are supported by skin elements: load, close, resize, timer, click, dblclick, error, mousedown, mouseup, mousemove, mouseover, mouseout, keypress, keydown, and keyup. Other events can, of course, be supported.

A typical external event handler names an event and defines the code that will run in connection with the event. For example, to create code to start Windows Media Player when the user clicks on a button, the following line can be inserted in the button's code:

onclick="JScript: player.URL='laure.wma';"

This code will play the file named laure.wma. Note that the word "on" is added to specific events.

Internal Events

Changes that occur in Windows Media Player or changes in a skin can be detected. These changes are defined as internal events and can be changes in Windows Media Player object properties or methods, changes in skin attributes, and so on. The inventive skinning model can detect these internal events and make the skin react to them in a definable way. Internal events and their handling are discussed in more detail in section entitled "Property Synchronization".

Exemplary Computer Architecture

The description below constitutes but one exemplary computer architecture or object model that is capable of implementing the inventive skinning techniques and methods. It is to be appreciated that departures from the described architecture can be made without departing from the spirit and scope of the claimed subject matter.

Figure 11:
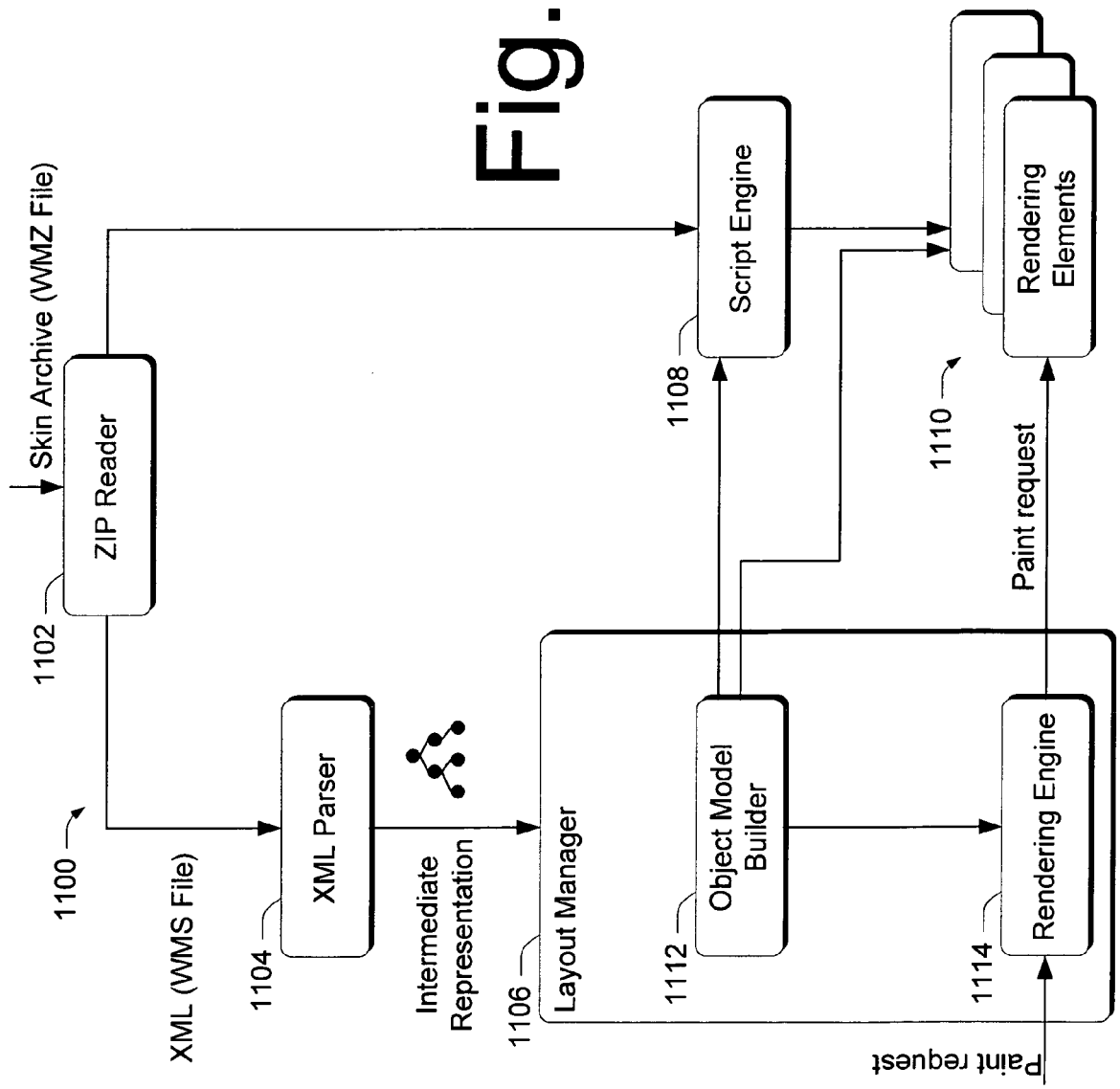
FIG. 11 is a block diagram of an exemplary computer architecture in accordance with one described embodiment.

FIG. 11 shows a computer architecture generally at 1100 that comprises a ZIP reader 1102, a XML parser 1104, a layout manager 1106, a script engine 1108, and one or more rendering elements 1110. In this example, layout manager 1106 is implemented as an ActiveX control and comprises an object model builder 1112 and a rendering engine 1114. This architecture is used to process the skin definition file and provide the software elements or components that cooperate to render a skin.

Recall that the skin definition file is defined as an XML file that can be compressed as a WMZ file. The layout manager 1106 is given a file name to a skin definition file. The layout manager then instructs zip reader 1102 to extract the XML and any files, including script files, that are included with the WMZ file. This extraction is done directly to memory so that the files are not exploded into separate folders. Most of the reading of the files takes place directly from memory. This is different from other prior art systems that keep files comprising a skin in one or more folders managed by the operating system's file manager. By extracting the files directly to memory, performance of the overall system is enhanced, as will be appreciated by those of skill in the art.

The skin definition file (in XML format) is received and processed by XML parser 1104. Any suitable XML parser can be used. The parser parses the skin definition file to provide an intermediate representation in the form of a hierarchical data structure that describes the skin and its attributes. An exemplary XML file is shown and described in connection with FIG. 10 above. An exemplary hierarchical data structure in the form of a tree is diagrammatically represented adjacent the XML parser in FIG. 11.

The layout manager uses the intermediate representation to create a scriptable object model. Specifically, in this example, object model builder 1112 processes the intermediate representation to provide one or more rendering elements 1110 which are objects in the object model. The rendering elements are created in memory. To do this, the object model builder simply walks the intermediate representation looking for the appropriate XML tags, and then creates the necessary objects or rendering elements that are associated with the tags. The rendering elements represent components that have been specifically written or defined for the skin. For example, the rendering elements can comprise controls such as buttons and/or other elements of a skin. Examples of other rendering elements can include those associated with text, bitmaps, text boxes, lists of text, pop up menus, and play lists. All of the rendering elements are created by examining the specification in the XML. As an example, consider the XML file of FIG. 10. There, within the BUTTONGROUP tag, two exemplary rendering elements can be created by object model builder 1112—one for the play button (corresponding to the PLAYELEMENT tag) and one for the stop button (corresponding to the STOPELEMENT tag).

If necessary—that is, if the XML specifies script in connection with the skin definition, the object model builder 1112 instantiates script engine 1108. After the script engine is instantiated, the layout manager provides the engine with a handle to the various rendering elements that have been created in memory. This is done so that the script engine can call the various rendering elements if and when various events require interaction with the rendering element.

Consider the following example: a user defines a skin in the form of a yellow duck. This skin has three rendering elements—one associated with a head, one associated with a body, and one associated with the duck's legs. Assume also that the user wishes for the duck's legs to walk whenever music is played by the media player. To impart this functionality or interactivity to the skin, the user authors script that essentially waits for an event associated with music playing. This event then triggers the script engine to cause the duck's legs to be redrawn by rendering engine 1114 anytime music is playing and in manner that appears as if the duck is walking.

Continuing, once the rendering elements (and, if necessary, the script engine) have been created and any necessary relationships established between the rendering elements and the script engine, properties for the individual rendering elements are populated. Additionally, any events that are specified in the XML for any of the rendering elements are provided to script engine 1108. To populate the rendering element properties, in this example, the layout manager 1106 processes the XML intermediate representation to identify various "name-value" pairs. The name-value pairs can include such things as "visible=true" etc. In the FIG. 10 example, one name-value pair comprises "titleBar='false'". The layout manager or, more accurately object model builder 1112 filters through all of the name-value pairs and, for each rendering element 1110, it adjusts the properties as specified in the XML. So, for example, for a play button, the object model builder 1112 sets a visible property as TRUE.

In addition to populating rendering element properties using the XML intermediate representation, there are also images (i.e. art files and the like) that are associated with various controls that are referenced in the XML, e.g. the image that is associated with the down control when it is pressed down. The object model builder 1112 ascertains, from the XML intermediate representation, which image or art files are needed by the various controls and then passes this property to the appropriate rendering element. The rendering elements can then call the layout manager 1106 to retrieve the appropriate files that they need.

The above-described set up process happens for each of the rendering elements. That is, the rendering elements are created, their properties are populated, and they are handed any image or art files or supplemental files that they need.

Once this phase is complete, object model builder 1112 can also associate any script files with their associated skins. The object model accomplishes this task using the XML intermediate representation. Specifically, there is an attribute in the XML's VIEW element called scriptFile in which one or more script files can be specified. The object model builder reads this attribute and then requests the script files from zip reader 1102. Accordingly, the script files can be fetched as needed. Recall that one or more script files were previously placed in memory by the zip reader and can be obtained from there. Script files can also be fetched from the ZIP file as needed. Once zip reader 1102 provides the requested script files, layout manager 1106 provides them to script engine 1108. Accordingly, script engine 1108 now has the code that it needs to impart the scripted functionality to the button or skin.

Figure 12:
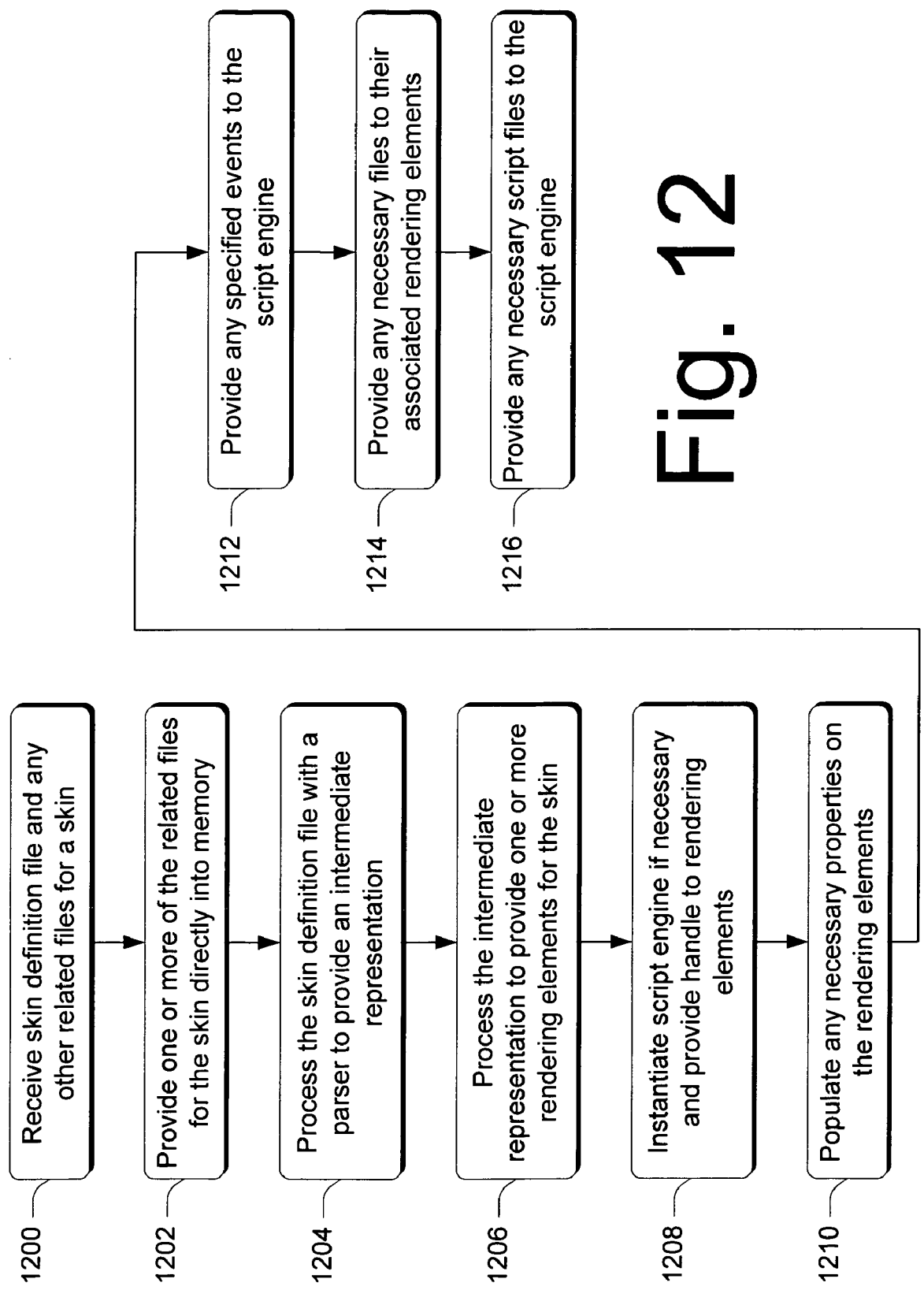
FIG. 12 is a flow diagram that describes steps in a method in accordance with one described embodiment.

FIG. 12 is a flow diagram that describes steps in a method in accordance with one described embodiment. The steps can be implemented in any suitable hardware, software, firmware, or combination thereof. In one implementation, the steps can be implemented in connection with the computer architecture illustrated and described in connection with FIG. 11. It is to be appreciated, however, that the FIG. 11 architecture constitutes but one exemplary computer architecture that can be utilized to implement the method about to be described.

Step 1200 receives a skin definition file and any other related files for a particular skin. The skin definition file and the related files can be collected and compressed into a Zip file which can, in turn, be maintained for retrieval in a skin archive. If this is the case, then this step can be implemented using a suitable Zip reader such as the one described in FIG. 11. If the skin definition file and related files are not collected and compressed, then the Zip reader likely would not be necessary. Step 1202 provides one or more of the related files for the skin directly into memory. This has performance benefits as it avoids file accesses through an operating system's file system manager. Step 1204 processes the skin definition file with a parser to provide an intermediate representation. In the illustrated and described embodiment, the skin definition file comprises an XML file. Accordingly, in this case, the parser comprises an XML parser. Step 1206 processes the intermediate representation to provide one or more rendering elements for the skin. Examples of rendering elements and how the intermediate representation is processed are given above. The rendering elements are advantageously provided in memory which can result in processing overhead savings.

Step 1208 instantiates a script engine, if necessary, and provides a handle or handles to the rendering elements that are provided in memory. Step 1210 populates any necessary properties on the rendering elements. In the described embodiment, the step is accomplished by referencing the XML intermediate representation which contains a description of the properties and their values. Step 1212 provides any specified events to the script engine. This step is implemented by ascertaining from the XML whether there are any events that are associated with the skin or any of its rendering elements. If there are any such events, they are provided to the script engine. Step 1214 provides any necessary files to their associated rendering elements. Recall that there may be one or more art files that are associated with the rendering elements. Accordingly, this step provides the associated art files to their respective rendering elements so that the files can be used. to render the individual elements. Step 1216 provides any necessary script files to the script engine. This step is implemented by ascertaining from the XML intermediate representation whether there are script files. If there are script files associated with a skin or rendering element, the script files are provided to the script engine from memory.

Rendering Phase

The above discussion can be considered as a "set up" phase in which an object model that is sufficient for rendering a skin is built and appropriately configured. In the rendering phase, the rendering engine 1114 (FIG. 11) actually renders or draws the skin. Rendering the skin can advantageously take place at runtime. This constitutes an improvement over past approaches in which the skins are not rendered at runtime. The rendering engine is programmed to figure out where to draw the skin components and how to composite them all together. In the described embodiment, the rendering engine manages layering and clipping for the visible controls in its object model. With respect to layering, the rendering elements can have a z-index attribute associated with them that essentially defines where the rendering elements are drawn relative to other rendering elements.

One advantage of the presently-described embodiment is that the rendering engine is capable of dynamically reforming the skin. This is a feature that is entirely absent from previous skinning models. As an example, consider the following:

Assume that a user has created and defined a duck skin such as the duck skin referenced above. Recall that the duck skin has three rendering elements—a head, body and legs. Assume also that the user defined a script file that listens for a music playing event so that the duck's legs can be moved. Whenever music is played, the script engine is notified. The script engine then responds and notifies the rendering element associated with the duck's legs that it must move and provides a time period over which this movement must take place. The command to move the duck's legs executes in the layout manager, and causes the rendering engine to redraw the rendering element associated with the legs.

Figure 13:
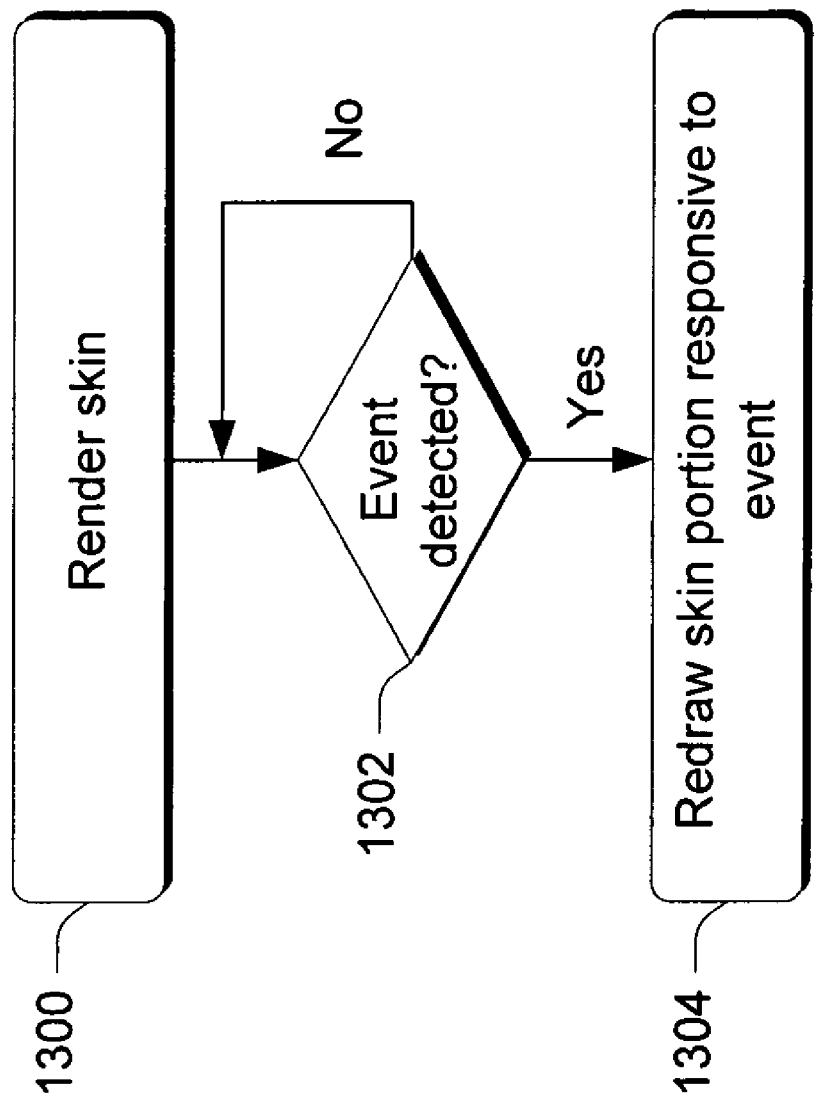
FIG. 13 is a flow diagram that describes steps in a method in accordance with one described embodiment.

FIG. 13 is a flow diagram that describes steps in a runtime skin rendering method in accordance with the described embodiment. The method can be implemented in any suitable hardware, software, firmware or combination thereof. In the illustrated example, the method is implemented in software.

Step 1300 renders a skin. This step can be implemented by a suitably programmed rendering engine. An exemplary rendering engine is shown and described in connection with FIG. 11. Step 1302 ascertains whether an event has occurred. Recall that events can be defined and provided to a script engine. In addition, script can be provided to the script engine that defines actions that are to take place when the defined events occur. If a defined event occurs, step 1304 redraws at least a portion of a skin responsive to the event. In the above described example, this step is implemented by the script engine calling a rendering element that is associated with the event and notifying the rendering element that it must be redrawn. Parameters associated with the redrawing can also be provided to the rendering element. Responsive to the notification to the rendering element, the rendering engine 1114 (FIG. 11) redraws at least a portion of the skin that corresponds to the rendering element.

Techniques for drawing skins, such as those techniques that are utilized by rendering engine 1114 will be understood and appreciated by those of skill in the art. Accordingly, and for the sake of brevity, such techniques are not described in detail here.

Subviews

A SUBVIEW element provides a way to manipulate a portion of a skin, for example, to provide a control panel that can be hidden when it is not being used. Thus, subviews represent subsections of a skin within a VIEW that can be moved or hidden.

FIG. 14 shows an exemplary skin 1400 in which subviews are employed. In this example, there are three different subviews 1402, 1404, and 1406.

Subview 1402 is a primary layout and contains a viewing area 1408 inside of which media can be rendered. Various control buttons 1410 are provided for the user to manipulate either the media that is being played or the player itself.

Subviews 1404 and 1406 are designed to look like speakers and are user engagable to reveal hidden controls and a playlist, respectively. Specifically, by engaging a button 1412, a user can expand or "pull out" a drawer that contains, in the case of subview 1404 various controls, and in the case of subview 1406 a playlist.

When a user clicks on button 1412, the layout manager 1106 (FIG. 11) is responsible for redrawing the subview. Without the subviews, to provide the same functionality, the layout manager would have to redraw each individual control button and determine where it is to be drawn relative to any other control buttons. The layout manager might have to be this many many times in order to smoothly transition from the top view of skin 1400 to the bottom view of skin 1400. With subviews, however, the layout manager simply redraws the subview or the container in which all of the control buttons appear.

In accordance with the described embodiment, a subview can be considered as a rendering element. Thus, various subviews can be described by and assigned attributes or properties using XML techniques similar to the techniques discussed above. For example, when a skin definition file is being defined, a subview tag can be used to group elements of the subview. Taking FIG. 14 as an example, a user would define a left subview to be subview 1404. In the XML definition, a subview tag for subview 1404 would contain additional tags and information within the tags to define other rendering elements such as the equalizer buttons, the volume control button and the balance button. Subsequently, the layout manager is programmed to display all of the contained rendering elements (i.e. equalizer buttons, etc.) relative to the parent subview. The same process would be used to define a right subview that corresponds to subview 1406.

Figure 15:
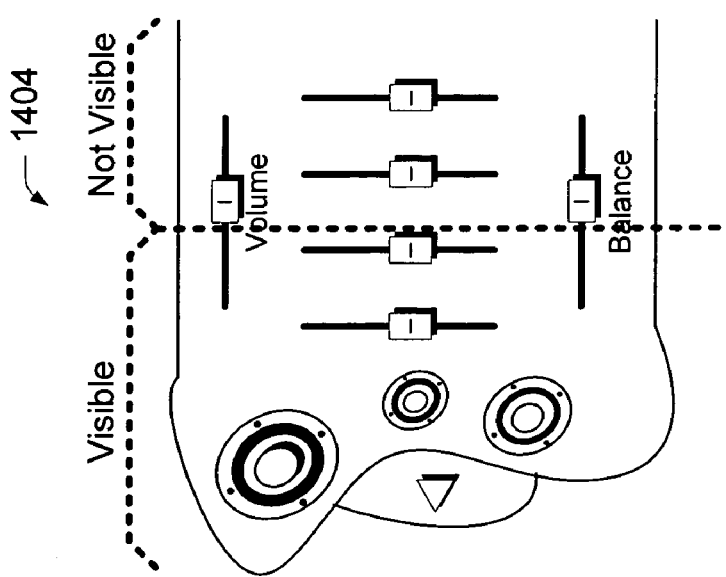
FIG. 15 is a diagram that illustrates a portion of the FIG. 14 skin.

To illustrate one way that the layout manager can draw and redraw subviews, consider FIG. 15.

FIG. 15 shows subview 1404 apart from skin 1400 in FIG. 14. Each of the subviews has an associated region that corresponds to that portion of the subview that is visible at any one time. When a skin is rendered by the layout manager, each subview has a corresponding region which represents exactly the area to which the subview is drawn. As an example, FIG. 15 shows an exemplary region in dash lines designated as "visible". If skin 1400 were to be drawn by the layout manager, only the "visible" portion of subview 1404 would be drawn at a particular appropriate time. That portion of subview 1404 that is designated as "not visible" would not be drawn. In this particular example, that portion would be hidden behind subview 1402.

Whenever any of the subviews change, e.g. subview 1404 moves two pixels to the left, its corresponding region is moved a corresponding amount. Otherwise, the user would not see a portion of the subview. The general concept of visible regions will be understood and appreciated by those of skill in the art.

In the illustrated and described embodiment, the layout manager 1106 (FIG. 11) manages the drawing and redrawing of subviews using a tree structure. As an example, consider FIG. 16.

Figure 16:
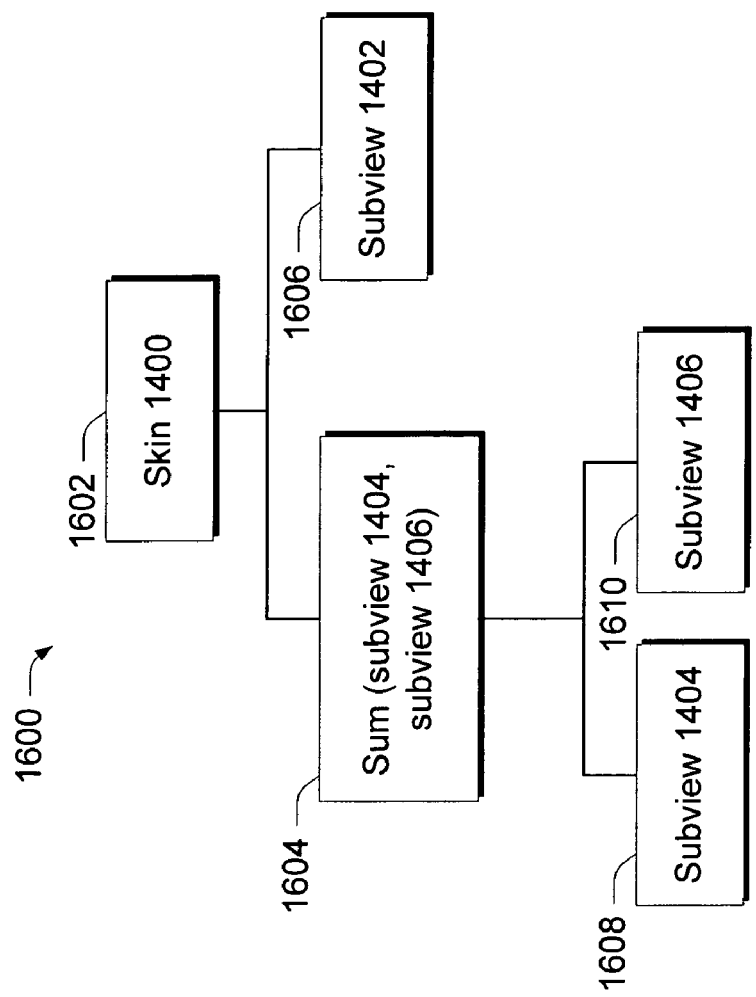
FIG. 16 is a tree diagram that illustrates aspects of one described embodiment.

FIG. 16 shows a tree structure 1600 that is associated with skin 1400 (FIG. 14). The tree structure comprises nodes 1602, 1604, 1606, 1608, and 1610. Each node is associated with a visible region of the skin. For example, node 1608 is associated with the visible region corresponding to subview 1404 (i.e. the left speaker in FIG. 14). Likewise, node 1610 is associated with the visible region corresponding to subview 1406 (i.e. the right speaker in FIG. 14). Node 1604 is associated with the visible region corresponding to the sum of visible regions associated with nodes 1608 and 1610. Node 1606 is associated with the visible region corresponding to subview 1402. Finally, node 1602 is associated with the visible region corresponding to the sum of visible regions associated with nodes 1604 and 1606.

Each of the nodes has attributes associated with it. Exemplary attributes can include, without limitation, visibility, x- and y-positions, shape, height and width. Whenever any of the attributes associated with a region change (e.g. in response to user input) that change can affect what the region looks like such that it must be redrawn. The layout manager is programmed to appreciate the change and modify the region accordingly.

In this particular example, the layout manager uses tree structure 1600 and traverses the tree to determine how to redraw the skin. Using skin 1400 of FIG. 14 and tree structure 1600 as an example, assume that the user clicks on subview 1404 to expand the subview so that they can access the controls shown in the bottommost illustration of FIG. 14. In this case, the user's action would change position attributes associated with node 1608 of the FIG. 16 tree structure. The layout manager would then traverse the tree structure by recalculating the region associated with node 1608. Once this recalculation is done, the layout manager would then recalculate the region associated with node 1604 by summing the regions associated with nodes 1608 and 1610. Once this was done, the layout manager would then recalculate the region associated with node 1602 (i.e. the overall skin) by summing the regions associated with nodes 1604 and 1606. In this manner, the layout manager can redraw a skin having subviews.

Figure 17:
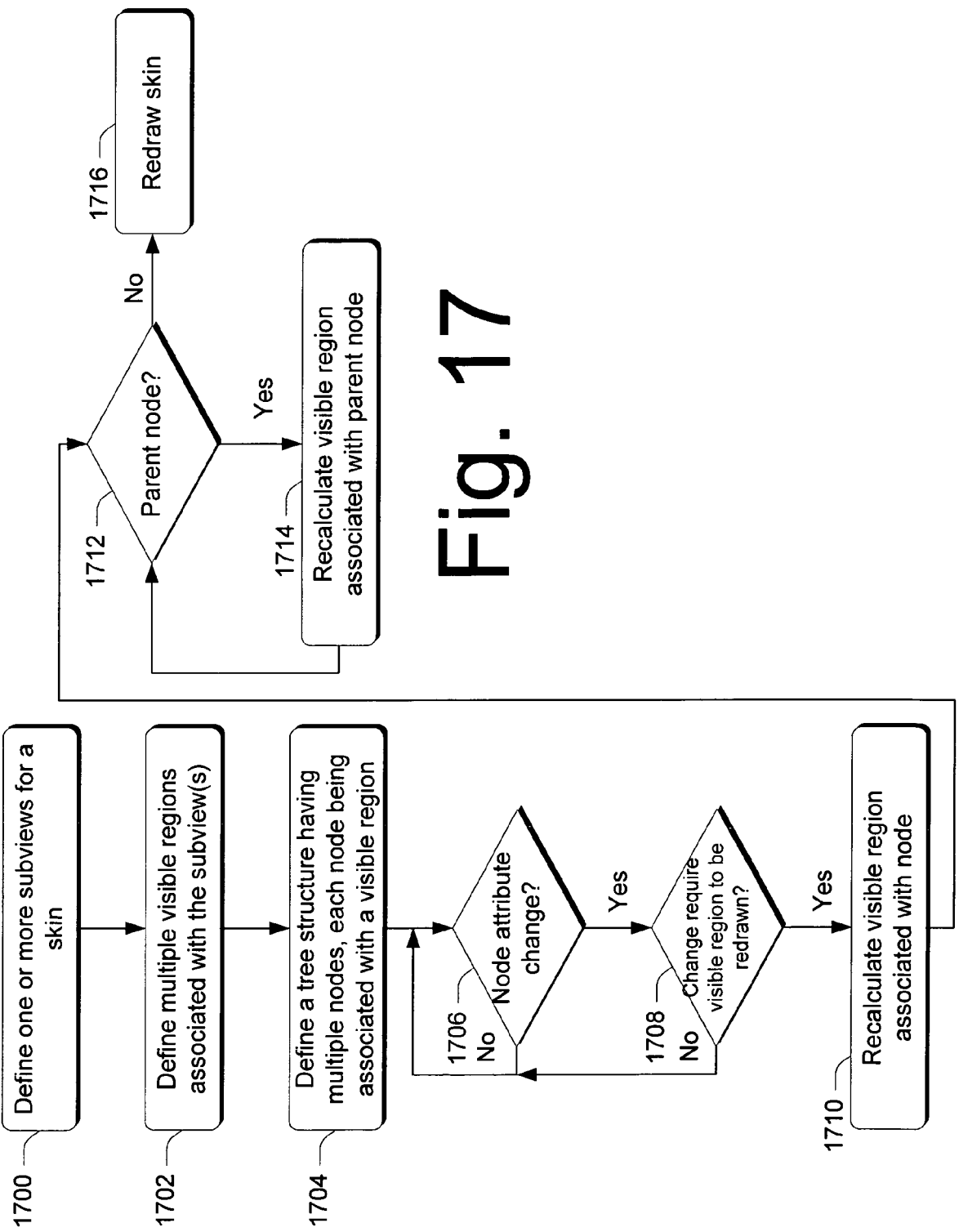
FIG. 17 is a flow diagram that describes steps in a method in accordance with one described embodiment.

FIG. 17 is a flow diagram that describes a skin rendering method in which subviews can be used. This method can be implemented in any suitable hardware, software, firmware, or combination thereof. In the illustrated example, the method is implemented in software.

Step 1700 defines one or more subviews for a skin. An example of how this can be done is described above and involves describing the subview using an XML data structure. Doing so enables hierarchical dependencies to be established that can later be used in the rendering or drawing process. Step 1702 defines multiple visible regions associated with the subview or subviews. Standard known techniques can be used to define and associate the visible regions with the subview or subviews. Step 1704 defines a tree structure having multiple nodes. Each node is associated with a visible region. An exemplary tree is shown and described in connection with FIG. 16. Step 1706 determines whether an attribute associated with one or more of the nodes has changed. Recall that the nodes can have attributes and that these attributes can be associated with how the subview is presented to a user. One of the things that can trigger an attribute change is user input. An example of this might be a user clicking on a particular part of the skin to expose a hidden portion of a subview. Step 1708 determines whether the attribute change requires the visible region to be redrawn. If the change does require the visible region to be redrawn, step 1710 recalculates the visible region associated with that node, given the attribute change. Step 1712 determines whether there is a parent node associated with the node for which the visible region was just recalculated. If there is, step 1714 recalculates the visible region associated with the parent node. The recalculation at the parent node level can involve summing multiple visible regions that are associated with child nodes of the parent. This step loops back to step 1712 and repeats until there are no more parent nodes. When there are no more parent nodes, step 1716 redraws the skin.

The above-described process can be used to dynamically reform the skin or user interface. Additionally, the regions can be used to track what each rendering element visually represents. Further, the steps of building and processing the tree structure can take place at runtime which enhances the performance of the system. Prior art skinning methods (i.e. using only static bit maps) do no such thing.

Property Synchronization

Most modern programming languages, and particularly those that deal with UI elements, work on a paradigm known as an event/response paradigm. That is, specific events are handled by code that is written for an event handler. Essentially, an event handler is programmed to take a particular action upon the occurrence of an event. In the UI context, events can be used to update or change the appearance of UI elements. For example, an event handler might be written to specifically handle a "volume change" event. Software code in this event handler would simply update the position of a volume slider based upon a volume change event.

One problem with the event handler approach is that it can add large amounts of code to provide a functioning UI. This, in turn, can be burdensome for the programmer or UI developer who desires to create a unique and flexible UI or skin. As an example illustrating the code complexity with the event/response paradigm, consider the following. Assume that you are a skin designer and you desire to create a media player that is very simple in design. Perhaps in your design you opt to include the following control buttons: stop, play, pause, back, forward, and rewind buttons. Assume that you also wish to have your control buttons enabled and disabled based on the current state of the media player. In order to do this, you have to programmatically define all of the events related to state that you need to listen for, and all of the responses for these events. This needs to be done for each and every button. In addition, it is entirely possible for multiple events to affect the state of any one button as well. Thus, there is an additional level of complexity. This model can result in an enormous amount of code just to manage the simple enabled state of six buttons.

In accordance with the described embodiment, one or more properties of a skin's elements (e.g. properties of control buttons) can be synchronized with properties of other elements or various states of the application of which they are a part.

In the illustrated and described embodiment, synchronization takes place through the use of certain keywords in the XML description that defines the skin, i.e. the skin definition file. There is a keyword that is used to synchronize properties to other properties, and there are keywords to synchronize properties to various states.

Synchronizing Properties to Properties

In the example that follows, we will use a volume slider button and its position property to illustrate how synchronization works.

Consider first FIG. 18 which shows an inline script that is used to synchronize a volume slider's position with the actual volume and vice versa. This code listens for an event that indicates that the volume has changed. When it receives such an event, it updates the position of the volume slider to a new position. Similarly, when the volume slider's position is changed, the volume for the media player is similarly adjusted. It should be noted that for each and every control or button for which this type of event/response is desired, there needs to script similar to the script described above.

Consider now FIG. 19 which uses an XML keyword to establish a property synchronization. In this example, a keyword "wmpprop" is used to synchronize the slider's position to the volume setting of the player. This is accomplished by line 1900. Line 1902 is script that accomplishes the reverse operation, i.e. it sets the volume to be synchronized with the position of the volume slider.

It should be noted that FIG. 19 defines a so-called one-way property synchronization. That is, the slider's position is synchronized to the volume setting of the player. Script is then used, in this example, to affect a synchronization in the other direction, i.e. synchronizing the volume setting of the player to the slider's position. The slider control is said to be a client of "player.settings.volume". It will be appreciated and understood by those of skill in the art, that property synchronization can be a two-way synchronization by setting up each entity or object to be a client of the other. In this example, "player.settings.volume" would then be a client of the slider control as well.

In this example, use of the keyword "wmpprop" in the XML skin definition file tells that layout manager 1106 (FIG. 11) that there is a property synchronization that needs to be established. In the presently-described embodiment, the layout manager establishes and oversees synchronization activities. To establish a property synchronization, the XML defines the keyword "wmpprop" as a value of an attribute associated with, in this example, the slider button. The text following the "wmpprop" value identifies the property that is to be listened to. Thus, in this example, the "wmpprop" keyword essentially tells the layout manager that it is to listen to the property that is associated with the keyword, i.e. "player.settings.volume". Whenever that property changes, the layout manager then takes steps to synchronize the object or element that was interested in that property—in this case the slider button.

As another example, consider FIG. 20. Here, the XML specification indicates that there are two buttons that are synchronized—the play button ("id=play") and the pause button ("id=pause"). Each button has an associated name/value pair in which the name portion of the pair is "visible". This identifies the visible property of each button. In this example, the value of the visible property for the play button is "TRUE" meaning that the button is visible. The pause button has had its visible property synchronized with the visible property of the play button. This has been done by assigning the value "wmpprop" to the pause button's visible property, and then associating with the "wmpprop" value the property to which synchronization is desired—in this case the play button's visible property. Now, if at a later time, some script sets "play.visible" to "FALSE", then an event is fired from the play button control and hooked by the layout manager. The layout manager then ascertains whether any other buttons are interested in being notified when the play button's visibility changes. The layout manager knows which other buttons desire a notification because of the property synchronization that it established between the pause button and the play button. Accordingly, then the layout manager provides the "FALSE" value to the pause button thereby making it not visible.

Synchronizing Properties to State

In accordance with the described embodiment, synchronizations can be established between properties and various states of an application. As an example, a Boolean synchronization can be established based on the availability or unavailability of a method call or property on an object in the programming model. This can allow skin authors to tie the enabled state of a UI element to the availability of a common function.

As an example, consider FIG. 21 which shows an example of a skin that uses script to drive the enabled state of the play button. In this specific example, when the play state of a button changes, a function "EnablePlayButton( )" has to run to check on whether it can enable the play button. Similarly, when the open state changes, the same function is run. Essentially then, in this example, there are hooks that listen to events, and then there is code that is written to update the UI as a result of this event.

FIG. 22 shows an example of a skin that uses an XML keyword "wmpenabled" to drive the play button enabled state. In this example, the playbutton attribute "enabled" is assigned a value "wmpenabled". This tells the layout manager that the enabled attribute is to be synchronized with a particular state. That state is specified by "player.controls.play( )". In other words, the enabled state of the play button is synchronized with the availability of the player controls play method. Accordingly, in this example, the skin can respond to the availability of various methods.

As a further example, consider the following. Assume that you wish to synchronize a play button on your media player, and you wish to set the enabled state of the play button based on knowledge you are able gain from a playback engine. Such knowledge might include, for example, whether there is a particular file loaded and playing (i.e. can you play or not). There are a number of factors that can go into a consideration of whether the play button should be enabled or not. All of this state information, however, resides in the playback engine which is called the player object in the object model. In the past, every relevant event would have to be hooked by an event handler to determine whether an action was required, and the button would have to be enabled through script, based on the state as ascertained through the hooked event. In the present case, however, the enabled state of the play button can be synchronized to the player object. Accordingly, instead of hooking all of the separate events, the player object can fire an event to the layout manager that indicates that a particular file is playing. The layout manager then processes that event and routes an appropriate value into the "enabled" property for the play button. This will become more evident below.

In accordance with the described embodiment, a "wmpdisabled" keyword enables the converse of the operation enabled by the "wmpenabled" keyword. Specifically, it allows a property to be synchronized to a state in which the property can be disabled.

FIG. 23 is a flow diagram that describes steps in a synchronization method in accordance with the described embodiment. The synchronization method enables properties to be synchronized with other properties or state, without the need to define script to do the synchronization. The method can be implemented in any suitable hardware, software, firmware or combination thereof. In the illustrated example, the method is implemented in software.

Step 2300 associates a property or state with a keyword. In the illustrated example, the property or state is that to which synchronization is desired. Using FIG. 20 as an example, the keyword would be "wmpprop" and the property would be the visible property of the play button. Step 2302 assigns the keyword and its associated property or state as a value of an attribute associated with a skin. So, in the FIG. 20 example, this step is accomplished by assigning "wmpprop:play.visible" to the "visible" attribute of the pause button. This step establishes the synchronization relationship between the pause button's visible attribute and the play button's visible attribute. Step 2304 synchronizes the attribute with the associated property or state such that changes in the associated property or state can affect the attribute. In the present example, this step is accomplished when the play button's visible state changes. When this happens, because of the synchronization relationship, the pause button's visible attribute changes as well.

In the present example, steps 2300 and 2302 are accomplished using an XML data structure. It is to be appreciated, however, that any suitable data structure can be used, with XML constituting a design choice.

Exemplary Computer Architecture for Property Synchronization

Figure 24:
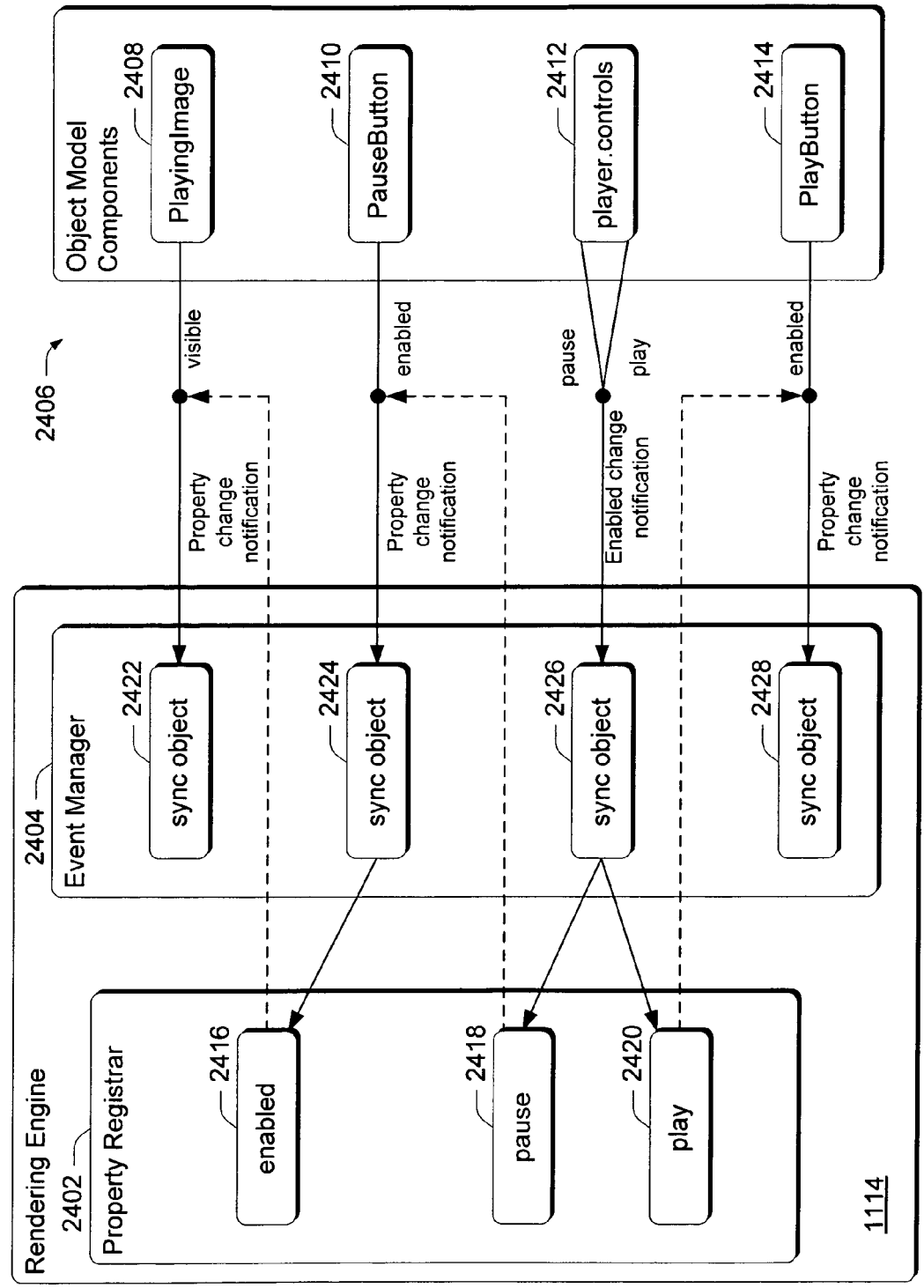
FIG. 24 is a block diagram that illustrates various components in an object model in accordance with one described embodiment.

FIG. 24 shows an exemplary computer architecture that can be utilized to implement property synchronization in accordance with the above-described embodiment. It is to be appreciated and understood that the described architecture constitutes but one way of implementing property synchronization. Accordingly, other architectures can be utilized without departing from the spirit and scope of the described subject matter.

As an overview to the processing that is enabled by the architecture about to be described, consider the following. One of the goals of the presently-described embodiment is to eliminate, to the extent possible, the amount of script that has been previously required by the event/response paradigm in the context of skins. The architecture about to be described accomplishes synchronization in a manner drawn along the following principles. There are components in the object model that are interested in having their properties synchronized with the properties of other object model components. When a component's property changes in value, the component generates a notification. This notification is centrally processed so that the property change value can be routed to any components that are interested in the change for purposes of synchronizing their own properties. In this approach, the need for each component in the object model to have their own collection of script that listens to events and provides appropriate responses can be eliminated.

Some of the components about to be described are implemented as part of rendering engine 1114 of layout manager 1106 (FIG. 11). In this example, rendering engine 1114 comprises a property registrar 2402 and an event manager 2404. Various object model components 2406 are also provided. The object model components are the objects that are exposed in the layout manager's programming object model and can range from objects that control playback to UI elements such as control buttons and sliders. In this particular example, object model components include a PlayingImage object 2408, a PauseButton object 2410, a player.controls object 2412, and a PlayButton object 2414. The object model components 2406 are the components that can have their properties synchronized. The property registrar 2402 and the event manager 2404 enable the property synchronization to take place as between the individual components of object model components 2406. Specifically, the event manager is responsible for receiving notifications of property changes and state changes from the object model components and routing them to the property registrar for processing. The property registrar, in turn, is responsible for routing new values (whether property values or new state values) to the appropriate object model components so that one or more of their properties can be synchronized.

In the present example, the property registrar 2402 comprises individual property registrar objects, examples of which are shown at 2416, 2418, and 2420. A property registrar object is created for every property or method in the object model that has an enabled or property listener. That is, certain components in object model 2406 may be interested in synchronizing their properties with other components' properties or states. For each of the properties or states to which synchronization is desired, there is a corresponding property registrar object. Specifically, consider the following property synchronizations and enabled notifications which would appear in the XML skin definition file:

PauseButton.Enabled="wmpenabled:player.controls.
  pause"
PlayButton.Enabled="wmpenabled:player.controls play"
PlayingImage.Visible="wmpprop:PauseButton.enabled"

In this example, the pause button's enabled property is synchronized with the player controls pause button through the use of "wmpenabled". Similarly, the play button's enabled state is synchronized with the player controls play button through the use of "wmpenabled". The visible property of the playing image button is synchronized with the enabled property of the pause button through the use of "wmpprop".

So, in this example, there are three "listeners" that are listening for either an enabled notification or a property value change. Specifically, the visible property of PlayingImage object 2408 is listening for the enabled property of the pause button; the enabled property of PlayButton object 2414 is listening for the play state of the player.controls object 2412; and the enabled state of PauseButton 2410 is listening for the pause state of the player.controls object 2412. Within the property registrar, there are three property registrar objects—an enabled object 2416 that routes enabled state information of the PauseButton object to any "listeners", a pause object 2418 that routes paused state information of the player.controls object to any listeners, and a play object 2420 that routes play state information of the play.controls object to any listeners.

Event manager 2404 is responsible for receiving all notifications of property changes and enabled changes and routing them to the appropriate property registrar. In this specific example, the event manager comprises one synchronization object per object model component. Accordingly, synchronization object 2422 is associated with PlayingImage object 2408, synchronization object 2424 is associated with PauseButton object 2410, synchronization object 2426 is associated with player.controls object 2412, and synchronization object 2428 is associated with PlayButton object 2414. Accordingly, each synchronization object is responsible for receiving notifications from their associated object model component, and routing the notifications to the appropriate property registrar object. Each synchronization object can have one or more property registrar objects associated with it. The property registrar objects, in turn, route property or enabled state change values to any of their listeners.

As an example, consider the following: When the pause state of player.control object 2412 changes, it sends a notification to its synchronization object 2426. The synchronization object in turn routes the notification to pause object 2418 in the property registrar. The pause object registrar 2418 knows who the listeners are for this event and accordingly notifies the PauseButton object 2410 with the appropriate value so that the PauseButton's enabled property can have its value changed to be synchronized with the pause stated of the player.control object.

FIG. 25 is a flow diagram that describes steps in a skin synchronization method in accordance with the described embodiment. The synchronization method enables properties to be synchronized with other properties or state, without the need to define script to do the synchronization. The method can be implemented in any suitable hardware, software, firmware or combination thereof. In the illustrated example, the method is implemented in software.

Step 2500 receives one or more notifications that pertain to a property or state change associated with a skin. The property or state change notification is generated by the object model component on which the change takes place. In this particular example, the notification is received by the rendering engine of the layout manager. More specifically, the notification is received by an event manager that comprises a synchronization object associated with the object model component that generated the notification. Step 2502 determines one or more object model components that are interested in the property or state change. In the example above, this step is implemented by the synchronization object routing the notification to the appropriate property registrar object which, in turn, is programmed to know which object model components are interested in the property or state change information. Step 2504 notifies one or more object model components so that their property or properties can be synchronized with the property or state change for which notification was received in step 2500. In the described embodiment, this step is implemented when the individual property registrar objects call the appropriate object model components.

CONCLUSION

The above described systems and methods provide improved skinning models and methods that are robust, flexible, dynamic and provide a rich user experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An XML data structure comprising multiple tag pairs, individual tag pairs being associated with and referencing information that can be utilized to render a skin, wherein:
    at least one tag pair contains information that identifies a primary image containing one or more user-viewable elements associated with the skin;
    at least one tag pair contains information associated with at least one subview that defines a subsection within the skin that can be moved or hidden based on a user's interaction with at least one or more user-viewable elements;
    at least one tag pair contains information associated with at least one interface control associated with the at least one subview;
    at least one tag pair contains information that identifies a mapping image, the mapping image having one or more colors, each color defining a region of the mapping image; and
    at least one tag pair contains information that establishes a color mapping relationship between one or more user-viewable elements and associated colors in the mapping image,
    wherein when the skin is rendered, each color region of the mapping image defines an area of the skin that is dedicated to its associated user-viewable element.

2. The XML data structure of claim 1, wherein one or more of the tag pairs are associated with individual skin elements and reference information that defines how a skin looks and how the skin elements are laid out.

3. The XML data structure of claim 1, wherein one or more of the tag pairs are associated with individual skin elements and reference information that defines how a skin looks, how the skin elements are laid out, and how at least one portion of the skin functions.

4. The XML data structure of claim 1, wherein the tag pairs collectively reference information associated with a background image and images associated with individual skin elements.

* * * * *